United States Patent [19]

Fushimi

[11] Patent Number: 5,642,505
[45] Date of Patent: Jun. 24, 1997

[54] BACKUP, RESTORATION, MIGRATION SYSTEMS OF A DATABASE

[75] Inventor: Shinya Fushimi, Kanagawa, Japan

[73] Assignee: Mitsubishi Denki Kabushiki Kaisha, Tokyo, Japan

[21] Appl. No.: 205,091

[22] Filed: Mar. 2, 1994

[30] Foreign Application Priority Data

Mar. 4, 1993 [JP] Japan .................................. 5-043850

[51] Int. Cl.$^6$ ........................................ G06F 17/30
[52] U.S. Cl. .............................. 395/620; 395/612
[58] Field of Search ........................... 395/612, 620

[56] References Cited

U.S. PATENT DOCUMENTS

| | | | |
|---|---|---|---|
| 4,961,133 | 10/1990 | Talati et al. | 395/650 |
| 5,136,707 | 8/1992 | Block et al. | 395/612 |
| 5,365,433 | 11/1994 | Steinberg | 395/612 |
| 5,404,508 | 4/1995 | Konrad | 395/620 |
| 5,408,652 | 4/1995 | Hayashi et al. | 395/612 |

OTHER PUBLICATIONS

"A Guide to Developing Client/Server SQL Applications", p. 247, Morgan–Kaufman, 1992.

"Transaction Processing: Concepts and Techniques", p. 622, Morgan–Kaufman, 1993.

IBM Technical Disclosure Bulletin, Jun. 1990 "SQLRE-ORG–DBSPACE Reorganizaiton Utility for SQL/DS Data Bases". Computertime Network Corporation Archive*SQL.

IBM Systems Journal "OS/2EE Database Manager overview and technical highlights", vol. 27, No. 2, 1988.

*Primary Examiner*—Thomas G. Black
*Assistant Examiner*—John C. Loomis
*Attorney, Agent, or Firm*—Wolf, Greenfield & Sacks, P.C.

[57] ABSTRACT

This invention provides an easy backup, restoration and migration method of a database system. The command interpreter receives a backup request and the controller identifies the backup object in the backup request by referring to the definition. The backup-migrate-restore-procedure generator generates a backup procedure of the backup object identified by the controller by referring to the definition. The controller converts the backup object to a command form of SQL in accordance with the procedure generated by the backup-migrate-restore-procedure generator and stores in the storage medium. The stored data are the replace information, definition, dependence information, data, journal and program. Restoration of the system and migration of the database to another system is enable by inputting such data. Backup, migration and restoration of a system is able to be made in an identical apparatus. Furthermore, since a command form of SQL is used, a special means is unnecessary for migration and restoration.

37 Claims, 13 Drawing Sheets

FIG.2

```
REPLACE INFO.  ~ 50
    $U1:SUZUKI    ~ 51
    $U2:TANAKA    ~ 52

DEFINITION  ~ 60
    CREATE USER  $U1   ~ 61
    CREATE USER  $U2   ~ 62

SET USER TO $U1    ~ 63
    CREATE SCHEMA S1   ~ 64

SET USER TO SU2    ~ 65
    CREATE SCHEMA S2   ~ 66
    CREATE SCHEMA S3   ~ 67

SET USER TO $U1    ~ 68
    CREATE TABLE S1.T1(t11 NUMERIC [4],t12......)   ~ 69
    GRANT SELECT ON S1.T1 TO $U2 WITH GRANT OPTION   ~ 70
    CREATE VIEW S1.V1(v11,v12) AS SELECT *
        FROM S1.T1 WHERE t11 > 100   ~ 71

SET USER TO $U2    ~ 72
    CREATE TABLE S2.T2(t21 NUMERIC [2],t22......)   ~ 73
    CREATE VIEW S2.V2(v21,v22,v23) AS SELECT *
        FROM S1.T1,S2.T2 WHERE t11=t23   ~ 74
    CREATE VIEW S3.V3(v31,v32,v33) AS SELECT * FROM S2.V2 ~ 75

DEPEND. INFO.  ~ 80
    $U1:    ~ 81
    $U2:    ~ 82

S1:$U1  ~ 83
    S2:$U2  ~ 84
    S3:$U2  ~ 85

T1:S1   ~ 86
    T2:S2   ~ 87

V1:T1,S1   ~ 88
    V2:T1,T2,S2,SELECT PRIVILEGE FOR T1 FROM $U1 TO
           $U2   ~ 89
    V3:V2,S3   ~ 90

SELECT PRIVILEGE FOR T1 FROM $U1 TO $U2:$U1,$U2,T1 ~ 91

P1:V2   ~ 92
    P2:T2   ~ 93
    P3:V1,V3   ~ 94

DATA  ~ 100
    INSERT INTO T1 ((1,abcdef,2),(2,dddddd,3),(3,xxxxxx,4),....) ~ 101
    INSERT INTO T2 ((1,abcdef,2),(2,dddddd,3),(3,xxxxxx,4),....) ~ 102

JOURNAL  ~ 110
    NORMAL FILE FORM   ~ 111

PROGRAMS  ~ 120
    NORMAL FILE FORM   ~ 121
```

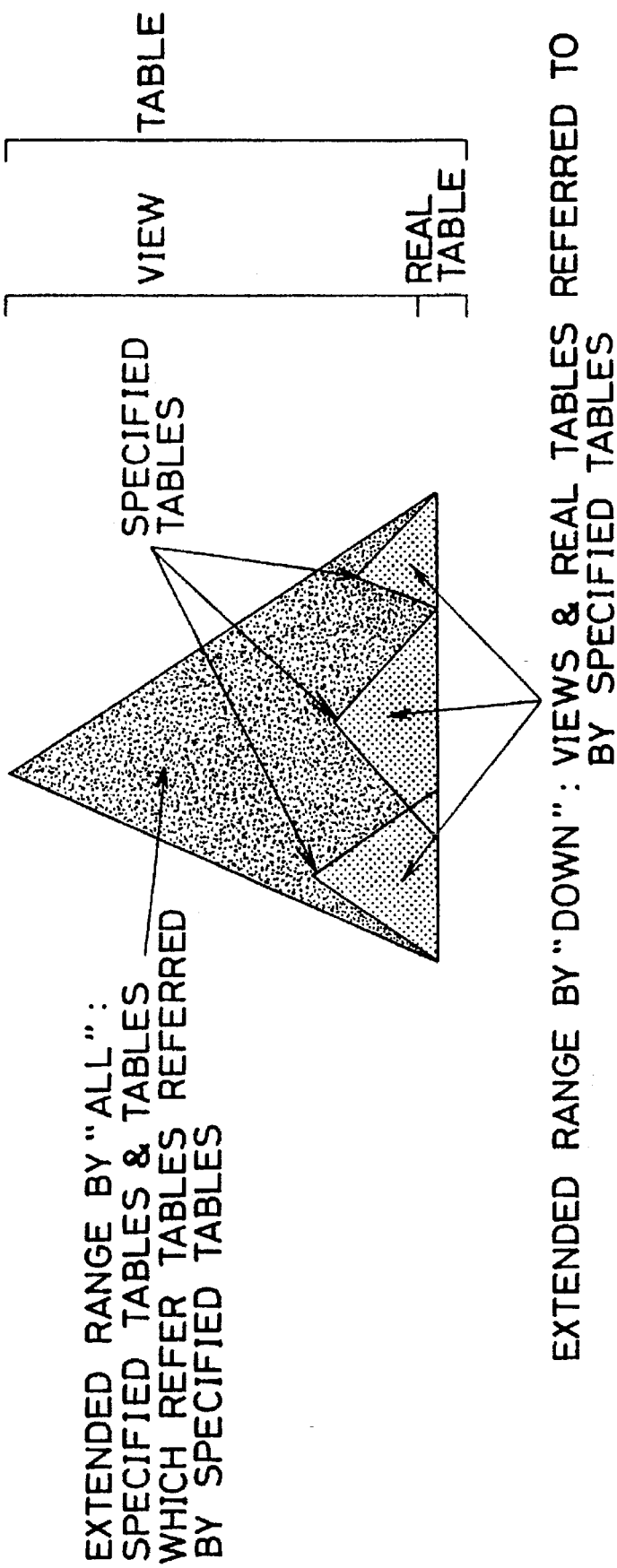

| B | S1.T1   S1.V1   S2.T2 |
|---|---|
| C | S2.V2 |
| D | S2.T2 |

FIG.9

| B | S1.T1   S1.V1   S2.T2   S2.V2 |
|---|---|
| C | S2.V2 |
| D | S2.V2 |

FIG.10

| B | S1.T1   S1.V1   S2.T2   S2.V2 |
|---|---|
| C | S3.V3 |
| D | S2.V2 |

G | SUZUKI

G | SUZUKI

H | TANAKA

FIG.14

G | TANAKA

H |

| USER NAME | No. OF SCHEMA OWNED |
|---|---|
| SUZUKI | 1 |
| TANAKA | 2 |

| SCHEMA NAME | OWNER | No. OF TABLES STORED |
|---|---|---|
| S 1 | SUZUKI | 2 |
| S 2 | TANAKA | 2 |
| S 3 | TANAKA | 1 |

FIG. 20
RELATED ART

| TABLE NAME | No. OF COLUMNS | SCHEMA NAME | VIEW/REAL TABLE |
|---|---|---|---|
| T1 | 2 | S1 | REAL TABLE |
| T2 | 3 | S2 | REAL TABLE |
| V1 | 2 | S1 | VIEW |
| V2 | 3 | S2 | VIEW |
| V3 | 3 | S3 | VIEW |

FIG. 21
RELATED ART

| CLM. NAME | TABLE NAME | SCHEMA NAME | DATA TYPE | LENGTH |
|---|---|---|---|---|
| t11 | T1 | S1 | NUM. | 4 |
| t12 | T1 | S1 | CHR. | 8 |
| t21 | T2 | S2 | NUM. | 2 |
| t22 | T2 | S2 | CHR. | 10 |
| t23 | T2 | S2 | NUM. | 2 |
| v11 | V1 | S1 | NUM. | 10 |
| v12 | V1 | S1 | CHR. | 16 |
| v21 | V2 | S2 | NUM. | 2 |
| v22 | V2 | S2 | CHR. | 10 |
| v23 | V2 | S2 | NUM. | 2 |
| v31 | V3 | S3 | NUM. | 2 |
| v32 | V3 | S3 | CHR. | 10 |
| v33 | V3 | S3 | NUM. | 2 |

FIG.22
RELATED ART

| VIEW NAME | SCHEMA NAME | VIEW DEFINITION |
|---|---|---|
| V1 | S1 | 'SELECT * FPOM S1.T1 WHERE t11 >100' |
| V2 | S2 | 'SELECT t11, t12, t21 FROM S1.T1, S2.T2 WHERE t11 = t23' |
| V3 | S3 | 'SELECT v21 FROM S2.V2' |

FIG. 23
RELATED ART

| VIEW NAME | BELONGING SCHEMA NAME | REFERRED TABLE NAME | BELONGING SCHEMA NAME |
|---|---|---|---|
| V1 | S1 | T1 | S1 |
| V2 | S2 | T1 | S1 |
| V2 | S2 | T2 | S2 |
| V3 | S2 | V2 | S2 |

FIG. 24
RELATED ART

| GRANTOR | RECEIVER | PRIVILEGE TYPE | OBJECT | SCHEMA NAME | WITH GRANT OPTION |
|---|---|---|---|---|---|
| _SYSTEM | SUZUKI | SELECT | T1 | S1 | YES |
| _SYSTEM | SUZUKI | UPDATE | T1 | S1 | YES |
| _SYSTEM | SUZUKI | DELETE | T1 | S1 | YES |
| _SYSTEM | SUZUKI | INSERT | T1 | S1 | YES |
| _SYSTEM | SUZUKI | SELECT | V1 | S1 | YES |
| _SYSTEM | SUZUKI | UPDATE | V1 | S1 | YES |
| _SYSTEM | SUZUKI | DELETE | V1 | S1 | YES |
| _SYSTEM | SUZUKI | INSERT | V1 | S1 | YES |
| _SYSTEM | TANAKA | SELECT | T2 | S2 | YES |
| _SYSTEM | TANAKA | UPDATE | T2 | S2 | YES |
| _SYSTEM | TANAKA | DELETE | T2 | S2 | YES |
| _SYSTEM | TANAKA | INSERT | T2 | S2 | YES |
| _SUZUKI | TANAKA | SELECT | T1 | S1 | YES |
| _SYSTEM | TANAKA | SELECT | V2 | S2 | YES |
| _SYSTEM | TANAKA | SELECT | V3 | S3 | YES |

FIG. 25
RELATED ART

| PROGRAM ID | LOCATION OF PROGRAM IN OS |
|---|---|
| PROG1 | /user/bin/prog 1 |
| PROG2 | /user/bin/prog 2 |

FIG. 26
RELATED ART

| PROCEDURE ID | PROGRAM ID | LOCATION OF PROCEDURE |
|---|---|---|
| P1 | PROG1 | /sql/plans/p1 |
| P2 | PROG1 | /sql/plans/p2 |
| P3 | PROG2 | /sql/plans/p3 |

FIG. 27
RELATED ART

| PROCEDURE ID | TABLE NAME | SCHEMA NAME |
|---|---|---|
| P1 | V2 | S2 |
| P2 | T2 | S2 |
| P3 | V1 | S1 |
| P3 | V3 | S3 |

BACKUP, RESTORATION, MIGRATION SYSTEMS OF A DATABASE

BACKGROUND OF THE INVENTION

1. Field of the Invention

This invention relates to backup, restoration and migration systems of a program and data in a database system.

2. Description of the Related Art

A relational database is rapidly prevailing. In the relational database, an international standard language which is called SQL (JIS X3005 ISO/IEC 9075:Database Language SQL) is commonly used as a database language. Therefore, the relational database and the international standard database language SQL are assumed to be used in the following explanations.

FIG. 15 shows a basic configuration of an application program and a database.

Generally, a database system is composed of a database definition where contents of the data are described and the application program which operates in reference with the definition in addition to the processing data. The definition is called a catalog, repository, data directory/dictionary, etc. Furthermore, the data are always updated and the update history is stored in a special file. The special file which stores the update history is called a journal, log, etc.

Meanwhile, the database language such as SQL is a language to process the database (to retrieve required data from the database, to update, delete and insert the data in the database, to define the data to manipulate the data in the database, etc.). The database language is unable to program the process of communication, display control, etc. which is necessary for operations. Therefore, it is common in the application program that the program related to the database process is written in SQL and the rest is written in a conventional language such as COBOL, etc.

When a program which contains a SQL statement is compiled, a part which is written in SQL is compiled to a SQL procedure, while the rest is compiled as a normal load module. The SQL statement is replaced by a procedure call (sql_exec in FIG. 15) which is set to retrieve the SQL procedure which is complied via a database system kernel. Furthermore, an ID of the SQL procedure which is registered in the database system is given as an argument of the procedure call.

It differs according to the realization methods of the system, but it is common that the load module and the SQL procedure which are generated by using SQL are registered as a part of the definition in the SQL system.

FIG. 15 shows the basic configuration of the application program and the database. In FIG. 15, the SQL program is inserted in a COBOL application program.

The SQL program is compiled by a compiler. When the compiler compiles the SQL program, an ID is given to each SQL program. In FIG. 15, ID No. 23 and ID No. 24 are given to respective SQL procedures corresponding to the SQL program.

Meanwhile, the COBOL application program is compiled to an executable form of the load module. The load module contains a call statement to execute the SQL procedure. The call statement calls the SQL procedure registered in the catalog by using the ID of the SQL procedure NO. 23 and No. 24 as arguments. Accordingly, the database process which is written in the SQL procedure is executed.

As FIG. 16 shows, the application program is executed like a normal program until the procedure call (sql_exec) for the database system process. Then, the SQL procedure corresponding to the procedure call is retrieved via the database system kernel and executed. As described, the application program accesses the database appropriately and executes the required processes.

The definition of the database is explained in the following.

The database system creates and controls the definition related to the database in various ways. For example, in SQL, the database information is controlled concentrically to avoid double defining of the data and to realize effective control of stored information in the database. A group of the definitions is called a catalog. In SQL, the followings are objects to be controlled in the system:

(1) A Real Table

The real table is the data corresponding to a conventional file. A field which constitutes the real table is called a column. Each column has attributes such as a data type, length, etc.

(2) A View

The view corresponds to a virtual file, etc. The view shows a result to be obtained by applying conditions to the real table, and is treated as if a real table. The data are presented in modified forms in addition to the original form. Consequently, illegal access to the data is prevented and common patterns of accesses are merged into view definitions. Even a complex case, where multiple real tables (files) are joined and presented in one table (file), is realized by views. Furthermore, the view is also created by referring to other (multiple) views. Both of the real table and the view are generally called a table.

(3) A Schema

The schema corresponds to a conventional directory, etc. The schema is a container to arrange the tables, etc. separately. For example, when a schema name is S1 and a table name is T1, the table (the real table and the view) is named S1.T1 by placing the schema name on the top.

(4) A Database User (5) Privilege of the Database Users

Concerning the operation of the real table and the view, the user who created the table owns all the privileges (to select, update, delete and insert). When the privileges are granted to other users appropriately, the accesses to the database are able to be controlled in a certain group of users.

In SQL, the privileges to access the data are controlled strictly and the privileges to select, update, delete and insert the data are controlled accordingly for each real table and view and for each user. Basically, the privileges are owned by the creators of the real tables, views, etc, but the privileges may be granted to others. Furthermore, the granting action itself may also be allowed to others. To allow the granting action is called as granting the privileges "WITH GRANT OPTION."

(6) The Application Program of the Database and the SQL Procedure Used in the Program In SQL, the above-described (1)–(6) are controlled in the catalog as the following information, for example:

a) Information of user catalog (user name, number of schemas owned)

User names and numbers of schemas owned by the users b) Information of schema catalog (schema name, owner name, number of tables stored)

Schema names, names of schema owners, a number of tables in the schema c) Information of table catalog (table name, column number, belonging schema name, view or real table)

This information controls both real tables and views together as tables. This information includes table names, a number of columns, schema names of the tables, and real tables or views.

d) Information of column catalog (column name, belonging table name, belonging schema name, data type, length)

Information for each column. Column names, table names which the columns belong to, schema names which the tables belong to, data type, length, etc.

e) Information of view definition catalog (view name, belonging schema name, view definition)

This information controls definition for each view. This information includes view names, schema names which the views belong to and view definition.

f) Information of reference relation of view and table (view name, belonging schema name, referred table name, referred table's belonging schema name)

The views are created by referring to other views and real tables. For each referred table, there is a view name, schema name which the view belongs to, table name which the view refers to and schema name which the table belongs to.

g) Information of authority catalog (grantor, receiver, type, object, schema name of the object, with grant option or not)

This information is related to the privileges granted to database users to access the tables. The privileges correspond to conventional privileges like readable, writable, executable, etc. For example, this information includes grantors, receivers, privilege types (SELECT, UPDATE, INSERT AND DELETE privileges for the concerning table), tables concerning the privileges, with grant option or not.

Especially, when a new table is created, the creator is supposed to receive the privileges from the system and a special value (__system) is set for the grantors of the privileges.

In order to create a view, a SELECT privilege is at least necessary. When the created views don't satisfy certain conditions (such as referring to multiple tables, etc.), update becomes impossible and the UPDATE, DELETE AND INSERT privileges for the views are not generated.

h) Information of program catalog (application program ID, location of program in OS)

A catalog of application programs

This information includes the ID and the locations of the program in OS (directory, etc).

i) Information of procedure catalog (application program ID, procedure ID, procedure) A catalog of the SQL procedures compiled and generated corresponding to the SQL command used in the above application program This information includes program ID, SQL procedure ID and procedure.

j) Information of reference relation of procedure and table (application program ID, procedure ID, schema name, table name)

This information controls tables referred to by each procedure of application program. This information is provided for each procedure and for each referred table.

Samples of a database and a catalog are explained in the following. Contents of the database in FIG. 17 are controlled as catalog information shown in FIGS. 18–27.

In the database shown in FIG. 17, there are two users, Suzuki and Tanaka (see FIG. 18). The user Suzuki owns schema S1 and the user Tanaka owns schema S2 and S3 (see FIG. 19). Furthermore, the schema S1 contains real table T1 and view V1. The schema S2 contains real table T2 and view V2 and the schema S3 contains view V3 (see FIG. 20).

The view V1 refers to T1 (see FIG. 23). The definition is as follows:

SELECT * FROM T1 WHERE t11>100 (see FIG. 22)
The view V1 is updatable (see FIG. 24).

The view V2 refers to T1 and T2 (see FIG. 23). The definition is as follows:

SELECT t11, t12, t21 FROM T1, T2 WHERE t1=t23 (see FIG. 22)

The view V2 is not updatable as multiple tables are referred to (see FIG. 24). Since the view V2 refers to the table T1 owned by the other person (Suzuki), a SELECT privilege must be granted to Tanaka by Suzuki in advance (see FIG. 24).

The view V3 refers to V2 (see FIG. 23). The definition is as follows:

SELECT v21 FROM V2 (see FIG. 22)
The view V3 is not updatable as multiple tables are referred to (see FIG. 24).

Program PROG1 contains two SQL statements. They are SQL procedure P1 and P2 (see FIG. 25 and FIG. 26). Meanwhile, program PROG2 contains a SQL statement, SQL procedure P3 (see FIG. 25 and FIG. 26).

The SQL procedure P1 refers to V2 (see FIG. 27). The SQL procedure P2 refers to T2 (see FIG. 27). The SQL procedure P3 refers to V1 and V3 (see FIG. 27).

Furthermore, Suzuki grants Tanaka a privilege to select (including refer) concerning T1 with grant option (see FIG. 24).

As described, the catalog information in FIGS. 18–27 are samples of the definition in the database.

Furthermore, the database system which uses SQL, etc. accompanies the following characteristics:

(1) A history of all the updates, deletion, etc. executed to the database is stored in the journal. Therefore, even if the database is cleared or damaged, it is able to be recovered always.

(2) When the database is changed by adding index, changing access privilege. etc., the SQL procedure registered in the catalog is no more an optimal procedure. In that case, when the SQL procedure is executed via the COBOL application program, the concerning SQL procedure is dynamically recompiled and an optimal procedure is re-generated in accordance with the change. The procedure is registered in the catalog and the execution resumes.

Problems to be Solved by the Invention

The above-described characteristics are realized. However, the following problems exist;

(1) All the definitions of the database including other developing applications are controlled together in a catalog in a system. Therefore, when a developed application is intended to be packaged, it is difficult to extract only necessary parts to be packaged. For example, a real table is referred to by multiple views and the view is referred to by the multiple views. Additionally, a privilege is necessary to refer to a view and a condition where the privileges are defined must be reproduced every time, when a view is created.

For example, in the above-mentioned case, the tables T1 and T2 must be created in order to create the view V2. In addition, the schema S1 and S2 and owners of each schema, user Suzuki and user Tanaka must be generated in order to create the table T1 and T2. Furthermore, after the tables T1 and T2 are created, the SELECT privilege must be granted to Tanaka by Suzuki. Otherwise, Tanaka is unable to refer to T1 and the view V2 is not created.

As described, the definitions are complicatedly related to each other. Additionally, it is necessary to restore the definition historically in a chronological order. At present,
a) necessary parts are acknowledged and extracted in a necessary order by a human,
b) furthermore, restoration is made carefully by a human in a migrated location.

As described, conventional creation and diffusion of a packaged software is difficult. The complicated installation and development by a human has been necessary for each concerning system.

(2) Recently, many machines are connected via LAN (Local Area Network). It is getting a popular style that when a software is developed in a machine, the result is distributed to other multiple machines via LAN. However, even if the system provides such environment, it has been difficult for the application program which accesses the database to utilize the environment effectively. It has been also difficult to distribute the software due to the above-described problems.

(3) Additionally, CASE (Computer Aided Software Engineering) which controls the whole software engineering is prevailing. In CASE, repository which controls the definition in the engineering work is similar to the described catalog. Therefore, the problem mentioned in (1) occurs, when engineering work environment is migrated or the engineering work is distributed to multiple groups.

(4) Possibly, the database itself needs to accompany special functions in addition to the conventional functions in order to restore the definition historically in the migrated location.

For example, when the information on a number of tables in each schema is migrated, the whole content of the catalog including the information are saved. When the package is installed, the saved information may be retrieved and the concerning part of the catalog in the system may be updated directly in the migrated location. However, in that case, a special interface for the catalog processing (direct update of the part of the catalog) is necessary besides the normal database function. Even if the package is developed by using a standard language like COBOL and SQL, since the special interface depends on the specifications of venders, the migration of the system among different venders is impossible.

(5) The conventional journal stores the update history for the whole database system. Therefore, the whole database must be stored (backuped) in order to restore the database. Even if it is known that only a small part of the whole database has been updated, the whole database is always backuped. Therefore, maintenance operation time tends to be long.

(6) In the migration of the system, it is difficult to create an ID in order to keep the corresponding relationships of the application program and the SQL procedure registered in the catalog.

Especially, when the application program is migrated to another machine or another SQL system, the migrated ID might conflict with the ID which is already assigned in the operating application program and the SQL procedure in the machine. Therefore, the migration is difficult. Additionally, in the migrated location, the migrated SQL procedure might not be compiled to an optimal SQL procedure always due to the data volume, etc.

SUMMARY OF THE INVENTION

One of the objects of the present invention is to provide an apparatus and a method to solve the above-mentioned problems.

It is a further object of this invention to provide an apparatus and a method to backup, migrate and restore the program and the data easily in the database system.

It is a further object of this invention to provide an apparatus and a method wherein the definition, data and program which are necessary for the specified application from the database system can be extracted consistently in regardless of the time and mutual relationships, and consequently, the restoration and migration of the database system is able to be made easily.

It is a further object of this invention to provide an apparatus and a method wherein the same process may be used to restore and migrate the database system, and no special separate process for the restoration and the migration is necessary.

It is a further object of this invention to provide an apparatus and a method wherein the backup of the database system is made by reproducing a series of database language commands, and only a system which may execute the database language is necessary in order to restore the backuped data or migrate the backuped data to another system so that no special restoration or migration means is necessary.

A database system backup apparatus according to the invention has a command interpreter means to input a backup request and its parameter, a control means to identify a backup object based on the backup request and its parameter interpreted by the command interpreter means and a backup procedure generator means to generate a backup procedure of a backup object identified by the control means, comprising the following elements:
(a) database access means for accessing the database system
(b) storage medium access means for saving the backup objects as backup data to the storage medium
(c) command interpreter means for inputting and interpreting a backup command of the database system
(d) backup procedure generator means for accessing the definition in the database system through the database access means and generating a backup procedure for saving the backup objects, and
(e) control means for identifying the backup objects in the database system based on the backup command interpreted by the command interpreter means, giving the backup objects to the backup procedure generator means so as to get the backup procedure, extracting the backup objects from the database system with the database access means according to the backup procedure, and storing the backup objects to the storage medium with the storage medium access means.

The database system backup apparatus according to the invention has a characteristic that at least one of a user name, schema name, table name, view name, program name and privilege name to be backuped is input as a parameter for the backup request and the object type and range of the backup object is assigned. The control means has a characteristic that the backup object is identified by the definition based on the object assignment and the object type and range assignment.

The database system backup apparatus according to the invention has a characteristic that the database system is accessed by using a database language like SQL, etc. and the database system is accessed by the database access means in a database language like SQL, etc.

The database system backup apparatus according to the invention has a characteristic that information is written in a database language like SQL, etc., when the information is stored in the storage medium.

The database system backup apparatus according to the invention has a characteristic that the definition is converted to a form of a definition command for creating the definition written in a database language like SQL, etc., when the definition is backuped.

The database system backup apparatus according to the invention has a characteristic that the data are converted to a form of a data insert command for inserting data written in a database language like SQL, etc., when the data are backuped.

The database system backup apparatus according to the invention has a characteristic that replaces information for being possible to replace a value of a variable such as a user name, file name, etc. is created and stored, in case such a replaceable variable exists in the backup objects.

The database system backup apparatus according to the invention has a characteristic that a processing procedure written in a database language is stored as a source code in the program in advance in considering a case when the data process program is executed by calling out a processing procedure written in a database language like SQL, etc. and the program is ported to another type of machine.

The database system backup apparatus further has a characteristic that a program which owns the source code of the processing procedure instead of the processing procedure in an executable form is backuped, in case the processing procedure in an executable form cataloged in the definition is assigned as the backup object.

The database system backup apparatus according to the invention has a characteristic that an area reserve command to reserve a data recording area in a database is created and stored in the storage medium instead of backuping the data in the database.

In the database system backup apparatus according to the invention, the database system has a journal to record information of access history and the information of access history is recorded together with an ID such as a table name, etc. Further, the control means searches and backups only the information of access history which is related to the backup objects based on the ID such as a table name, etc.

The database system backup apparatus according to the invention has a characteristic that the backup procedure generator means identifies the dependence relation between the users, schemas, tables, views, privileges and programs, and the controller means stores the dependence relation generated by the backup procedure generator means as dependence information.

A database system restoration apparatus according to the invention has a characteristic that a part or all of a database is restored by inputting the stored data which are backuped by the database system backup apparatus.

A database system migration apparatus according to the invention has a characteristic that a database system is newly constructed in another type of machine or another machine by inputting the stored data which are backuped by the database system backup apparatus.

A database system restoration/migration apparatus according to the invention has a characteristic that a database is restored or migrated by inputting and executing a command written in a database language, in case that the data are backuped in a form of a command written in the database language like SQL, etc. by the database system backup apparatus.

A database system migration apparatus according to the invention has a characteristic that a database system is newly constructed by giving a new value for a replaceable variable based on the replace information in order to replace the variable, in case a replaceable variable exists in the data stored by the database system backup apparatus.

A database system migration apparatus according to the invention has a characteristic that a processing procedure in an executable form is generated and cataloged in the definition by compiling a source code of the processing procedure at an execution time under a condition that the processing procedure is not cataloged in the definition at the execution time, in case the database backup apparatus stores a program accompanying a source code of a processing procedure instead of a processing procedure in an executable form.

A database system restoration/migration apparatus according to the invention has a characteristic that the restoration/migration procedure generator means to restore or migrate a database by inputting the stored data which are backuped by the database system backup apparatus and inputting the restore specification or migrate specification, by referring to the dependence relation of the stored data, and by evaluating the restoring or migrating data in accordance with the restore specification or migrate specification.

A database system according to the invention, having programs and data and their definitions related to the programs and data, characterized in that extraction means for extracting programs, data and definitions, and backup means for saving the extracted programs, data and definitions as backup data, wherein backup data are used to both of restoration of the database system and installation of a database system.

The extraction means uses SQL for accessing and extracting programs, data and definitions.

The backup means creates SQL command sequences as the backup data.

The backup means creates the SQL command sequences in consistent with the database system referring to the definitions.

A database system backup-restoration-migration method according to the invention may comprises the steps of:

(a) inputting a backup request of the database system;

(b) identifying data to be saved according to the backup request;

(c) saving the identified data in an executable form to a storage medium;

(d) inputting one of a restore request and a migrate request; and (e) executing the saved data in the storage medium in the executable form based on one of the restore request and the migrate request so as to restore data or migrate data.

The saving step is performed by a database language used in the database system.

The saving step converts data into a command written in a database language and saves the command to the storage medium.

The executing step executes the command written in a database language to restore or migrate the data.

BRIEF DESCRIPTION OF THE DRAWINGS

In the drawing,

FIG. 2 shows a sample of stored information which is backuped by the database system backup apparatus of this invention;

FIG. 3 shows an identification method of the backuping real tables and views in case that the real tables and views are backuped in a database system of this invention;

FIG. 4 is used to explain a backup procedure of the real tables and views by the backup procedure generator of this invention;

FIG. 5 is used to explain a backup procedure of the real tables and views by the backup procedure generator of this invention;

FIG. 6 is used to explain a backup procedure of the real tables and views by the backup procedure generator of this invention;

FIG. 7 is used to explain a backup procedure of the real tables and views by the backup procedure generator of this invention;

FIG. 8 is used to explain a backup procedure of the real tables and views by the backup procedure generator of this invention;

FIG. 9 is used to explain a backup procedure of the real tables and views by the backup procedure generator of this invention;

FIG. 10 is used to explain a backup procedure of the real tables and views by the backup procedure generator of this invention;

FIG. 11 is used to explain a backup procedure of the real tables and views by the backup procedure generator of this invention;

FIG. 12 is used to explain a creation procedure of a GRANT statement by the backup procedure generator of this invention;

FIG. 13 is used to explain a creation procedure of a GRANT statement by the backup procedure generator of this invention;

FIG. 14 is used to explain a creation procedure of a GRANT statement by the backup procedure generator of this invention;

FIG. 20 shows a sample of information of table catalog;

FIG. 21 shows a sample of information of column catalog in a database system;

FIG. 22 shows a sample of information of view definition catalog in a database system;

FIG. 23 shows a sample of information of reference relation of view and table in a database system;

FIG. 24 shows a sample of information of authority catalog in a database system;

FIG. 25 shows a sample of information of program catalog in a database system;

FIG. 26 shows a sample of information of procedure catalog in a database system;

FIG. 27 shows a sample of reference relation of procedure and table in a database system.

DETAILED DESCRIPTION OF THE PREFERRED EMBODIMENTS

Embodiment 1

As explained in the Related Art, an international standard language called Structured Query Language (SQL) is generally used as a database language. Therefore, the following explanation, a relational database and the international database language are assumed to be employed. Substantially, other types of database and database language are similarly adoptable.

In the embodiment 1, the database system described in the Related Art using FIGS. 17–27 is explained as an embodiment.

Figure 1:
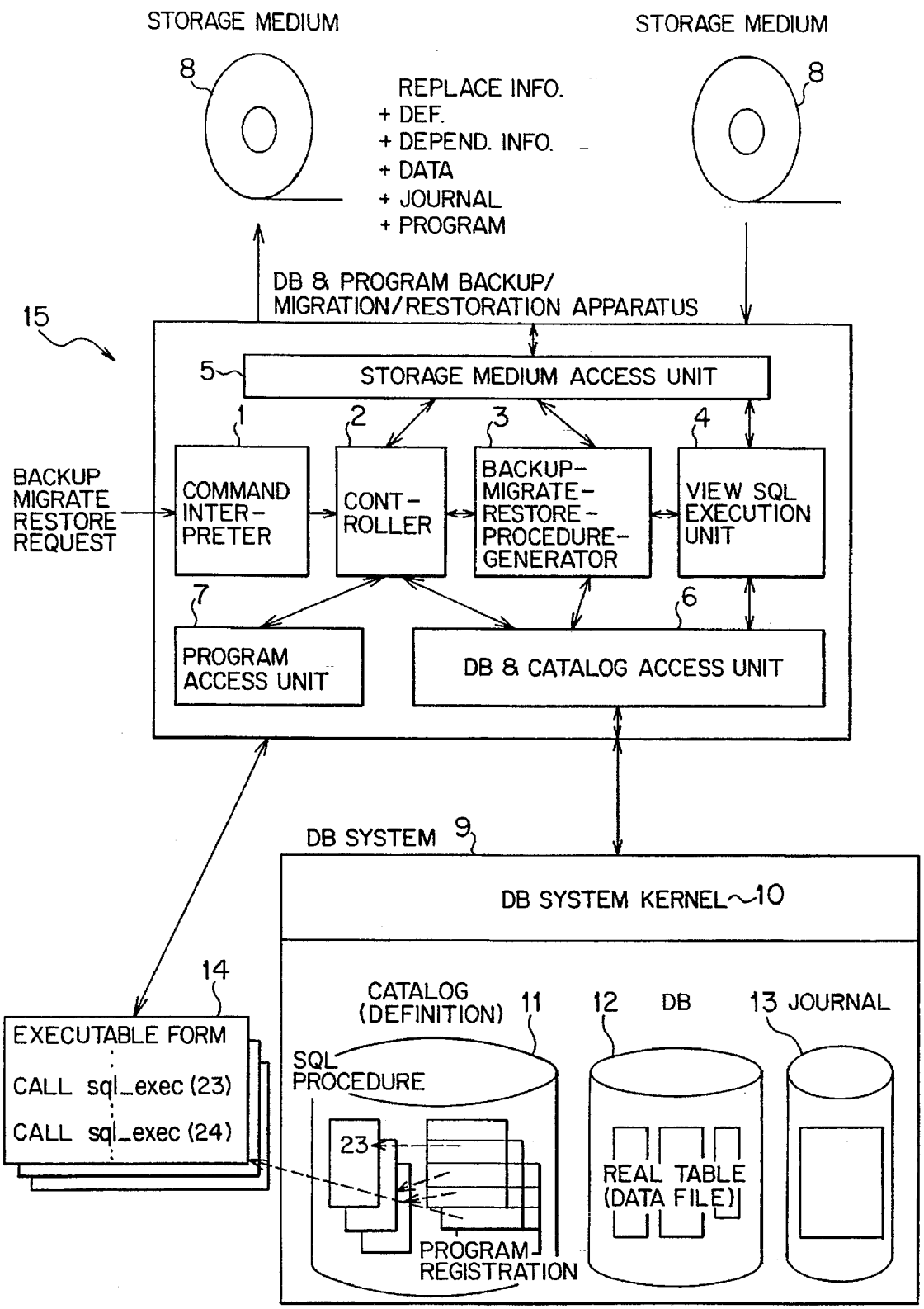
FIG. 1 shows a block chart of the database and program backup/migration/restoration apparatus of this invention.
Figure 15:
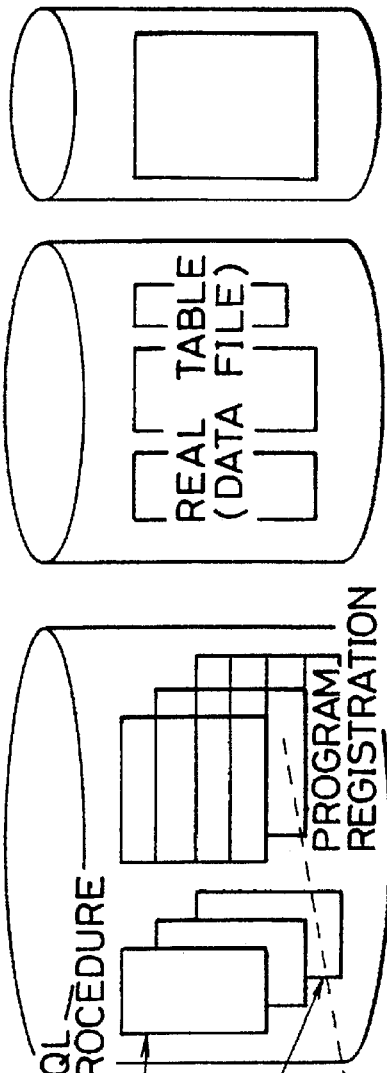
FIG. 15 shows a block chart of a related database system.
Figure 16:
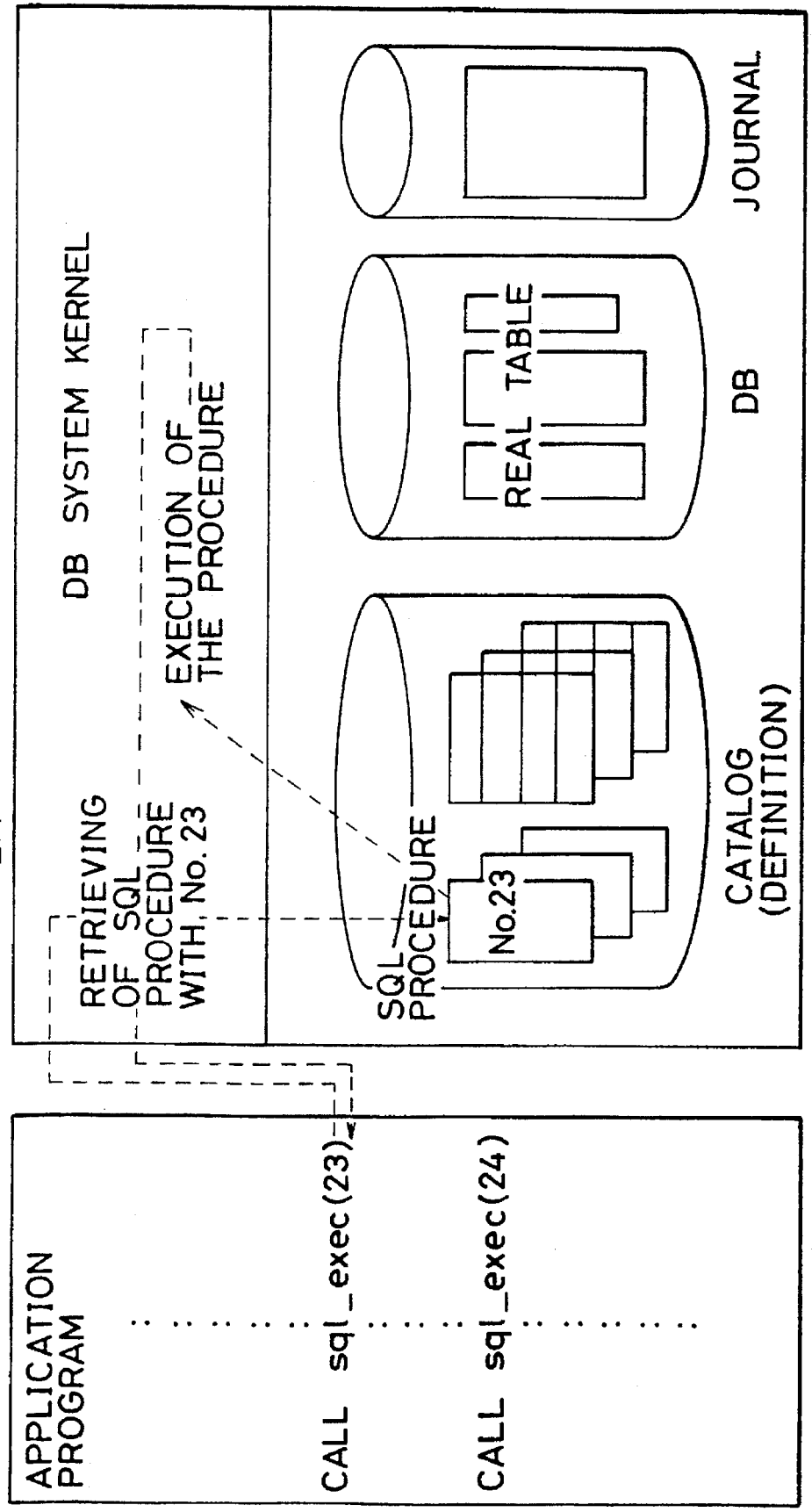
FIG. 16 is used to explain an execution method of a SQL procedure in a related database system.
Figures 17, 18, 19:
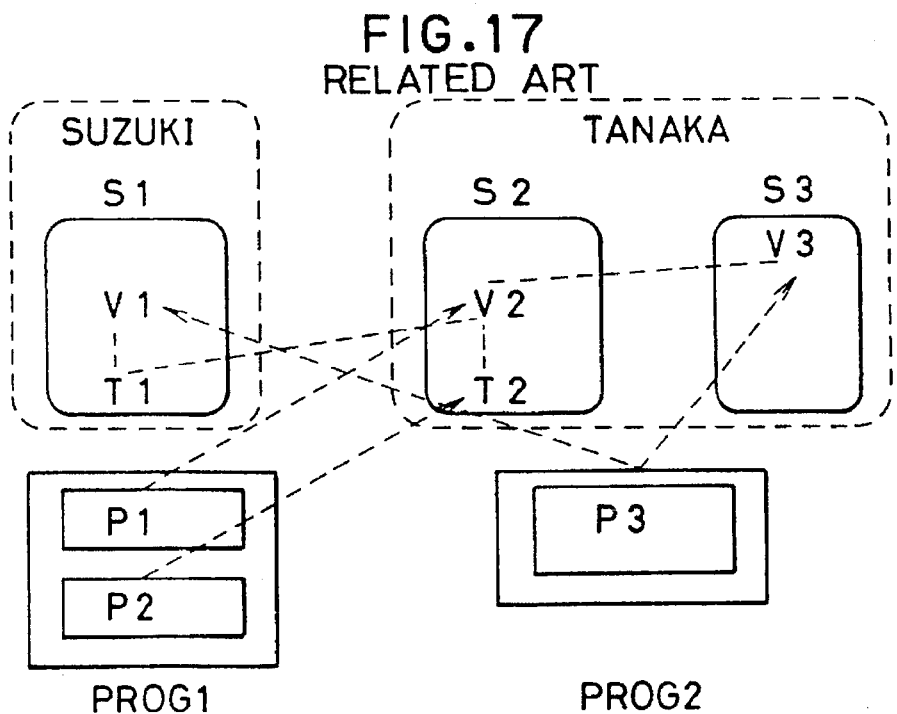
FIG. 17 shows a block chart of a database system.
FIG. 18 shows a sample of information of user catalog.
FIG. 19 shows a sample of information of schema catalog.

FIG. 1 shows an example of a database and program backup, migration and restoration apparatus 15 as an embodiment of this invention. The backup is to copy a part or all of the already existing database 12 and program 14 to a storage medium 8 such as a magnetic tape, magnetic disk, etc. The migration is to port the database system 9 operated in a computer system to another computer system by using the database and the program which are backuped and copied to the storage medium. The restoration is to re-copy the database and the program which are backuped and copied to the storage medium back to the original computer system. Here, the migration differs from the restoration in the sense that the migration is conducted for another computer system, while the restoration is conducted within the original computer system.

In the following, each unit of the database and program backup, migration and restoration apparatus is explained based on FIG. 1.

1) Command Interpreter

The command interpreter 1 offers an interface for the users and receives requests such as the backup, restoration, migration, etc. and a list of the objects of the requests from the users. The command interpreter sends the requests to a controller 2 after justification of the requests. In case of the migration, the command interpreter receives the replacement instructions such as user names, etc. from the user if necessary and sends the instructions to the controller.

2) Controller

The controller controls the whole apparatus and identifies the objects for the backup, restoration and migration assigned by a user by using a database and catalog access unit 6.

In case of the backup, a backup-migrate-restore-procedure generator 3 is called in order to create the definition, replace information and dependence information based on the specified objects and process requests. The created information is converted to an executable form of SQL and stored in the storage medium orderly by a storage medium access unit 5. Further, the data (content of the real table) are read out by using the database and catalog access unit and converted to an executable form of SQL in order to be stored in the storage medium by the storage medium access unit, if specified. Further, a journal 13 is read out by the database and catalog access unit and stored in the storage medium by the storage medium access unit, if specified. The program is read out by a program access unit 7 and stored in the storage medium by the storage medium access unit, if specified.

In the above-described operations, if a view is specified to be evaluated to be a real table, or if a part of a real table in the database is requested to be transformed by the execution of the SQL command, a view SQL execution unit 4 executes the requests adoptively.

In case of restoration and migration, the restoration and migration objects are selected by reading out the definition, replace information and dependence information from the storage medium and by calling the backup-migrate-restore-procedure generator by using the readout information and the specified objects. When replacement is necessary for the identified objects, replacing content is input via the command interpreter by a user. Then, as specified, necessary replacement is made according to the replace information, when the definition on the identified object is read out from the storage medium by the storage medium access unit. Accordingly, the restoration and migration is conducted by the database and catalog access unit.

The definition is in a form of a command of the SQL definition system. Therefore, the operation is made by executing the command. Furthermore, if specified, the data (content of the real table) and the journal are read out from the storage medium by the storage medium access unit and restored and migrated in the system by the database and catalog access unit. Additionally, if specified, the program is read out from the storage medium by the storage medium access unit and stored in the database system by the program access unit.

For the above operations, when it is specified to evaluate and realize a view to be a real table, or when a part of real tables in the database is requested to be transformed by the execution of the SQL command, the view SQL execution unit executes the requests adoptively.

3) Backup-Migrate-Restore-Procedure Generator

The backup-migrate-restore-procedure generator receives the objects from the controller and creates the necessary definition and the definition order for the objects. In case of backup, the necessary information for creation is obtained by accessing the catalog 11 by the database and catalog access unit. In case of restoration and migration, the necessary information for creation is obtained by accessing the dependence information in the storage medium.

4) View SQL Execution Unit

The view SQL execution unit realizes the specified view or executes the SQL statement and sends the result to the controller.

5) Storage Medium Access Unit

The storage medium access unit reads out the specified content from the storage medium (magnetic tape, disk, etc.) and writes in the storage medium.

6) Database and Catalog Access Unit

The database and catalog access unit reads out the content of the database and the catalog and also writes in the database and catalog. This function is realized by executing a required SQL statement for the database system.

The database and catalog access unit also reads out the content of the journal and applies the readout content to the database in order to make the database current. There is no standard of SQL for the journal operation. However, some method is prepared for each system. For example, the readout and setting of the journal is made by the normal readout and creation of a file in operation system (OS) and the execution of the journal is made by the database system by using a RECOVER command, etc.

7) Program Access Unit

The program access unit reads out and sets the application program. It is enough if a normal access function to a file in the OS is provided.

The following shows the operation of the apparatus.

1) Operation of the Command Interpreter

The backup, migration and restoration request from a user is interpreted by the command interpreter in order to confirm the justification of the content. Then, the request is converted to an internal form and sent to the controller. The command interpreter receives the following assignments or specifications:

| | |
|---|---|
| Operation assignment = | BACKUP: backup operation<br>RESTORE: installation operation in a restoring or migrating location |
| A list of objects = | object, object,.... |
| Objects = | user name (interpreted as an abbreviation to specify all the belongings of the user)<br>schema name (interpreted as all the tables under the schema are specified)<br>schema name.table name (interpreted as the table is specified)<br>privilege name<br>program name |
| Object type assignment = | D: data<br>C: catalog<br>P: program<br>combination of the D, C and P (for example, D+P, etc.) |
| Object range assignment = | ONLY: Only specified objects are treated as objects.<br>DOWN: specified objects and all the referred objects by the specified objects are treated as objects.<br>ALL: specified objects, all the referred objects by the specified objects and all the objects referring to the specified objects are treated as objects. |
| Restricted range assignment = | user name list (schemas and tables, etc. of the users who are not on the list are exempted.)<br>schema name list (schemas and tables, etc. of the schemas which are not on the list are exempted.) |

A list of views which should be realized to be the real tables
A list of the SQL statements in order to select and transform the data for the real tables among the real tables 2) Operation of the Controller The controller construes the request from the command interpreter and controls the whole backup, migration and restoration operations.

[In case of the backup]

(1) The controller sends the objects received from the command interpreter to the backup-migrate-restore-procedure generator and receives catalogs of the objects and the definition, replace information and dependence information. The catalogs of the objects are as follows:

U: user catalog

S: schema catalog

T: real table catalog

V: view catalog

A: authority catalog

P: program catalog

RU: restricted user catalog

RS: restricted schema catalog (2) When the views in the view catalog V are specified to be evaluated to be the real tables, such views are realized to be the real tables by the evaluation. In the definition and the dependence information, the corresponding information of the realized views are replaced by the information of the real tables (a CREATE VIEW statement is replaced by a CREATE TABLE statement). Then, the real tables are stored. Furthermore, the views and real tables which are referred to by only the realized views are deleted from the definition.

(3) If C (catalog) is included in the object type assignment, the replace information, the definition and the dependence information are stored in the storage medium by the storage medium access unit.

(4) If D (data) are included in the object type assignment, the contents of the real tables in the real table catalog T are retrieved by the database and catalog access unit and stored in the storage medium as an INSERT command by the storage medium access unit. When the real tables created by the evaluation of the views in (2) are to be stored in the storage medium, the contents of the real tables stored in (2) are stored in the storage medium. When an execution of a SQL statement is specified for the real tables to be stored in the storage medium, the SQL statement is executed by the view SQL execution unit. The result is stored in the storage medium in a form of an INSERT command.

If the D (data) are included in the object type assignment, the journal is retrieved by the database and catalog access unit and stored in the storage medium by the storage medium access unit. In this case, as the journal accompanies the IDs of the real tables which were objects of operation, only the contents of the journal related to the tables in the real table catalog T are retrieved. If P (program) is included in the object type assignment, programs in the P (program) are retrieved by the program access unit and stored in the storage medium by the storage medium access unit.

[In case of the restoration and migration]

(1) The definition, replace information and dependence information is read out by the storage medium access unit.

(2) The controller sends the objects and the dependence information received from the command interpreter to the backup-migrate-restore-procedure generator and receives the catalogs of the objects. The catalogs of the objects are as follows:

U: user catalog
S: schema catalog
T: real table catalog
V: view catalog
A: authority catalog
P: program catalog
RU: restricted user catalog
RS: restricted schema catalog (3) The command interpreter receives the replacement assignment from a user and replaces the replacement file with the received replace information.

(4) If C (catalog) is included in the object type assignment, the database and catalog access unit restores and migrates the definition on the objects by replacing the definition based on the replace information. In this case, the SQL definition command such as CREATE USER statements, CREATE SCHEMA statements and CREATE TABLE, CREATE VIEW, GRANT statements are read out and executed in the stored order, while replacement is made based on the replace information. The statements are already stored in a consistent order in both time and space at the time of the backup. Therefore, the execution may be made in the stored order.

When a view in the view catalog V is assigned to be evaluated to be a real table, a CREATE VIEW command is converted to a CREATE TABLE command and the CREATE TABLE command is executed. Further, the CREATE TABLE command is stored as a SQL statement and executed later in (5). Among the views and real tables referred to by this view, the tables which are referred to by only this view are deleted from the definition. Such tables are distinguished by tracking the tables which are dependent only on this view among the dependence information.

(5) If D (data) are included in the object type assignment, the database and catalog access unit retrieves an INSERT statement which creates the content of a real table in the real table catalog T and executes the INSERT command to restore the content of the real table in the database. Furthermore, if an execution of a SQL statement is specified for the real table, the execution is made by the view SQL execution unit and the result is stored as T'. Then, the content of the real table is cleared once by the following command:

DELETE * FROM table name

Then, the content of the real table is replaced by the previous result by the following command:

INSERT INTO table name SELECT * FROM T'

The following is an example of this;

For example, real table T1 and view V1 which refers to the T1 exist. The view V1 is evaluated for the real table T1 by the execution of a SQL statement. If it is found that the real table T1 is referred to only by the view V1 and not referred to by any other views by referring to the dependence information, etc., it is not necessary to store the real table T1 in the database. Therefore, the real table T1 may be deleted.

In this case, T' which is the result of evaluation of the view V1 for T1 is stored once. When it is judged that the real table T1 will not be referred to by other views and other programs anymore, the real table T1 is deleted and the view V1 which is stored in the T' may be created as the real table.

When only the data of t11=100 are restored among the data of the real table T1,

SELECT * FROM T1
WHERE t11−100 are directly executed. Then, the original data of T1 are replaced with the result.

(6) If D (data) are included in the object type assignment, the journal is retrieved from the storage medium and applied to the database. In this case, as the journal accompanies the ID of the real table which was the object of the operation, only the content of the journal related to the table in the real table catalog T is retrieved.

(7) If P (program) is included in the object type assignment, the programs in the P (program) are retrieved by the program access unit and stored in the database system.

When the database is migrated from a machine to another machine, all the above steps are executed. When the database is restored within the same machine, two steps described in (5) and (6) are executed. These are realized, when only D (data) are assigned in the object type assignment.

When the present data are cleared and restored by assignment, the content of the database is cleared once by DELETE * FROM table name and restored.

When the content of the database is migrated, the system is also able to store the content in a higher speed instead of conveying the content as a SQL command by an INSERT command. For example, the content of the data may be stored in a form of a file and restored by replacing directly in the form of the file. In this case, the DELETE statement used in the restore operation is unnecessary.

Then, when operation starts, the restored application program is executed. Since the information of the SQL procedure catalog is not migrated together in this case, the accessing SQL procedure is not found in the catalog in the migrated location. Therefore, the system recompiles the concerning SQL procedure, registers the procedure as the information of the procedure catalog, and resumes execution. Consequently, the dynamic recompile function of the SQL system is utilized and the information of the procedure catalog is automatically reproduced.

Sample assignments and specifications which the command interpreter receives and sample objects which the controller receives from the backup-migrate-restore-procedure generator by the assignments and the specifications are explained. For example, the assignments and the specifications which the command interpreter receives may have various combinations. The following cases are examples when the definition which is necessary for the specified application may be retrieved:

a) [A case of all the necessary elements being specified]

All the elements constituting the application such as the users, schemas, real tables, views, programs and privileges are specified. Then, the system generates the necessary restore order by judging the relationships and the historic execution order of the specified information automatically.

b) [A case of user names being given and other elements being automatically extracted by the system]

Only one or multiple user names which constitute the application are given and the schemas, real tables, views, programs and privileges which the users own are automatically extracted. The system generates the necessary restore order by judging the relationships and the historic execution order of the information.

c) [A case of schema names being given and other elements being automatically extracted by the system]

Only one or multiple schema names which constitute the application are given and the users who own the schemas and the real tables, views and privileges owned by the schemas are automatically extracted. The system generates the necessary restore order by judging the relationships and the historic execution order of the information.

d) [A case of table names being given and other elements being automatically extracted by the system]

Only one or multiple table names which constitute the application are given and the schemas which the tables belong to, the users who own the schemas and the privileges related to the tables are automatically extracted. The system generates the necessary restore order by judging the relationships and the historic execution order of the information.

e) [A case of view names being given and other elements being automatically extracted by the system]

Only one or multiple view names which constitute the application are given and the schemas which the views belong to, the users who own the schemas, the privileges related to the views, the views and tables which the given views refer to and the privileges assumed for the reference are automatically extracted. The system generates the necessary restore order by judging the relationships and the historic execution order of the information automatically.

f) [A case of program names being given and other elements being automatically extracted by the system]

Only one or multiple program names which constitute the application are given and the users, schemas, real tables, views and privileges are automatically extracted. The system generates the necessary restore order by judging the relationships and the historic execution order of the information automatically.

g) [A case of privilege names being given and other elements being automatically extracted by the system]

Only one or multiple privilege names which constitute the application are given and the privileges and the users who grant and who receive the privileges, the real tables and views which are the objects of the privileges are automatically extracted. The system generates the necessary restore order by judging the relationships and the historic execution order of the information automatically.

h) Furthermore, in the above a)–g), all the views referring to the extracted real tables and views are extracted. The schemas, users and privileges which are necessary for the creation of the views are also extracted. The system generates the necessary restore order by judging the relationships and the historic execution order of the information automatically.

i) In the above a)–g) or in the combination of a)–g) and h), all the programs which refer to the extracted information are extracted.

In the following, some examples of the values of the user catalog U, schema catalog S, real table catalog T, view catalog V, authority catalog A and program catalog P which are identified by the controller in reference with the definition for the assignment and the specification received in the command interpreter are described based on the sample definition of the database shown in the Related Art.

The following example doesn't respond directly to the a)–i) which are described as the sample cases which are received by the command interpreter. One case or a combination of multiple cases is described. Further, in order to simplify the explanation, samples of only the list of the objects, object range assignments and restricted range assignments instead of all the assignments and the specifications received by the command interpreter are illustrated.

The user catalog U, schema catalog S, view catalog V, real table catalog T, authority catalog A, program catalog P, restricted user catalog RU and restricted schema catalog RS show each value received by the controller from the backup-migrate-restore-procedure generator. Due to the assignment input in the command interpreter, the backup-migrate-restore-procedure generator finds the user catalog U, schema catalog S, real table catalog T, view catalog V, authority catalog A, program catalog P, restricted user catalog RU and restricted schema catalog RS and outputs to the controller. This procedure is described later.

In the following examples, φ is used for the meaning of unspecified.

Example 1

| Backup of the specified real table | |
|---|---|
| A list of objects = | Suzuki, S1, S1. T1 |
| Object range assignment = | ONLY |
| Restricted range assignment = | none |
| User catalog U = | Suzuki |
| Schema catalog S = | S1 |
| View catalog V = | φ |
| Real table catalog T = | T1 |
| Authority catalog A = | φ |
| Program catalog P = | φ |
| Restricted user catalog RU = | φ |
| Restricted schema catalog RS = | φ |

Example 2

| Backup of the multiple specified real tables | |
|---|---|
| A list of objects = | Suzuki, Tanaka, S1, S2, S1. T1, S2. T2 |
| Object range assignment = | ONLY |
| Restricted range assignment = | none |
| User catalog U = | Suzuki, Tanaka |
| Schema catalog S = | S1, S2 |
| View catalog V = | φ |
| Real table catalog T = | T1, T2 |
| Authority catalog A = | φ |
| Program catalog P = | φ |
| Restricted user catalog RU = | φ |
| Restricted schema catalog RS = | φ |

Example 3

| Backup of a view and a real table which the view refers to | |
|---|---|
| A list of objects = | Suzuki, S1, S1. V1, S1. T1 |
| Object range assignment = | ONLY |
| Restricted range assignment = | none |
| User catalog U = | Suzuki |
| Schema catalog S = | S1 |
| View catalog V = | V1 |
| Real table catalog T = | T1 |
| Authority catalog A = | φ |
| Program catalog P = | φ |
| Restricted user catalog RU = | φ |
| Restricted schema catalog RS = | φ |

Example 4

| Backup of the multiple views and the real tables which the views refer to | |
|---|---|
| A list of objects = | Suzuki, Tanaka, S1, S2, S1. V1, S2. V2, S1. T1, S2. T2 |
| Object range assignment = | ONLY |
| Restricted range assignment = | none |
| User catalog U = | Suzuki, Tanaka |
| Schema catalog S = | S1, S2 |
| View catalog V = | V1, V2 |
| Authority catalog A = | Tanaka's SELECT privilege for T1 |
| Real Table catalog T = | T1, T2 |
| Program catalog P = | φ |
| Restricted user catalog RU = | φ |
| Restricted schema catalog RS = | φ |

Example 5 corresponds to the example 3. In the example 5, only the view name is specified and the table name which the view refers to is specified to be retrieved automatically.

Example 5

| Backup of a view and automatic backup of a related real table | |
|---|---|
| A list of objects = | S1. V1 |
| Object range assignment = | DOWN |
| Restricted range assignment = | none |
| User catalog U = | Suzuki |
| Schema catalog S = | S1 |
| View catalog V = | V1 |
| Real table catalog T = | T1 |
| Authority catalog A = | φ |
| Program catalog P = | φ |
| Restricted user catalog RU = | φ |
| Restricted schema catalog RS = | φ |

Example 6 corresponds to the example 4. In the example 6, only the view names are specified and the table names which the views refer to are specified to be retrieved automatically.

Example 6

| Backup of the multiple views and automatic backup of the related real tables | |
|---|---|
| A list of objects = | S1. V1, S2. V2 |
| Object range assignment = | DOWN |
| Restricted range assignment = | none |
| User catalog U = | Suzuki, Tanaka |
| Schema catalog S = | S1, S2 |
| View catalog V = | V1, V2 |
| Real table catalog T = | T1, T2 |
| Authority catalog A = | Tanaka's SELECT privilege for T1 |
| Program catalog P = | φ |
| Restricted user catalog RU = | φ |
| Restricted schema catalog RS = | φ |

Example 7

| Backup of a view and the tables which refer to the view | |
|---|---|
| A list of objects = | S1. V2 |
| Object range assignment = | DOWN |
| Restricted range assignment = | none |
| User catalog U = | Suzuki, Tanaka |
| Schema catalog S = | S1, S2 |
| View catalog V = | V2 |
| Real table catalog T = | T1, T2 |
| Authority catalog A = | Tanaka's SELECT privilege for T1 |
| Program catalog P = | φ |
| Restricted user catalog RU = | φ |
| Restricted schema catalog RS = | φ |

Example 8

| Backup of the views and automatic backup of all the related tables | |
|---|---|
| A list of objects = | S1. V2 |
| Object range assignment = | ALL |
| Restricted range assignment = | none |
| User catalog U = | Suzuki, Tanaka |
| Schema catalog S = | S1, S2, S3 |
| View catalog V = | V2, V3 |
| Real table catalog T = | T1, T2 |
| Authority catalog A = | Tanaka's SELECT privilege for T1 |
| Program catalog P = | φ |
| Restricted user catalog RU = | φ |
| Restricted schema catalog RS = | φ |

Example 9

| Backup of the related complicated views | |
|---|---|
| A list of objects = | V3 |
| Object range assignment = | DOWN |
| Restricted range assignment = | none |
| User catalog U = | Suzuki, Tanaka |
| Schema catalog S = | S1, S2. S3 |
| View catalog V = | V2, V3 |
| Real table catalog T = | T1, T2 |
| Authority catalog A = | Tanaka's SELECT privilege for T1 |
| Program catalog P = | φ |
| Restricted user catalog RU = | φ |
| Restricted schema catalog RS = | φ |

Example 10

Example 11

| Backup of all the belongings of the user | |
|---|---|
| A list of objects = | Suzuki |
| Object range assignment = | DOWN |
| Restricted range assignment = | none |
| User catalog U = | Suzuki |
| Schema catalog S = | S1 |
| View catalog V = | V1 |
| Real table catalog T = | T1 |
| Authority catalog A = | φ |
| Program catalog P = | φ |
| Restricted user catalog RU = | φ |
| Restricted schema catalog RS = | φ |

Example 12

| Backup of all the subjects under a schema | |
|---|---|
| A list of objects = | S1 |
| Object range assignment = | DOWN |
| Restricted range assignment = | none |
| User catalog U = | Suzuki |
| Schema catalog S = | S1 |
| View catalog V = | V1 |
| Real table catalog T = | T1 |
| Authority catalog A = | φ |
| Program catalog P = | φ |
| Restricted user catalog RU = | φ |
| Restricted schema catalog RS = | φ |

Example 13

| Backup of all the subjects under a schema and all the tables | |
|---|---|
| A list of objects = | S1, S2. T2 |
| Object range assignment = | DOWN |
| Restricted range assignment = | none |
| User catalog U = | Suzuki, Tanaka |
| Schema catalog S = | S1, S2 |
| View catalog V = | V1 |
| Real table catalog T = | T1, T2 |
| Authority catalog A = | φ |
| Program catalog P = | φ |
| Restricted user catalog RU = | φ |
| Restricted schema catalog RS = | φ |

Example 13 (cont.)

| Backup of the program and the related subjects | |
|---|---|
| A list of objects = | PROG2 |
| Object range assignment = | DOWN |
| Restricted range assignment = | none |
| User catalog U = | Suzuki, Tanaka |
| Schema catalog S = | S1, S2, S3 |
| View catalog V = | V1, V2, V3 |
| Real table catalog T = | T1, T2 |
| Authority catalog A = | Tanaka's SELECT privilege for T1 |
| Program catalog P = | PROG2 |
| Restricted user catalog RU = | φ |
| Restricted schema catalog RS = | φ |

Example 14

| Backup of the program and the tables | |
|---|---|
| A list of objects = | PROG1, T1 |
| Object range assignment = | DOWN |
| Restricted range assignment = | none |
| User catalog U = | Suzuki, Tanaka |
| Schema catalog S = | S1, S2 |
| View catalog V = | V1, V2 |
| Real table catalog T = | T1, T2 |
| Authority catalog A = | Tanaka's SELECT privilege for T1 |
| Program catalog P = | PROG1 |
| Restricted user catalog RU = | φ |
| Restricted schema catalog RS = | φ |

Example 15

| Backup of the program with restriction on schemas | |
|---|---|
| A list of objects = | PROG2 |
| Object range assignment = | DOWN |
| Restricted range assignment = | S1 |
| User catalog U = | Suzuki |
| Schema catalog S = | S1 |
| View catalog V = | V1 |
| Real table catalog T = | T1 |
| Authority catalog A = | φ |
| Program catalog P = | PROG2 |
| Restricted user catalog RU = | φ |
| Restricted schema catalog RS = | φ |

Example 16

| Backup of the view with restriction on users | |
|---|---|
| A list of objects = | V3 |
| Object range assignment = | DOWN |
| Restricted range assignment = | Suzuki |
| User catalog U = | Suzuki |
| Schema catalog S = | S1 |
| View catalog V = | V1 |
| Real table catalog T = | T1 |
| Authority catalog A = | φ |
| Program catalog P = | PROG1 |
| Restricted User catalog RU = | φ |
| Restricted schema catalog RS = | φ |

FIG. 2 shows a sample content of the storage medium. In the FIG. 2, the replace information 50, the definition 60, the dependence information 80, the data 100, the journal 110 and programs 120 are shown.

The replace information 50 stores replace information of user names. In this example, each replace information is shown as a temporary name starting with $. In this case, user 1 is Suzuki and user 2 is Tanaka. When the replace information is not replaced, the user 1 is restored or migrated as Suzuki, while the user 2 is restored or migrated as Tanaka. However, when the user names, Suzuki or Tanaka already exist in the migrating system, the replace information may be used to change the name of user 1 from Suzuki to Yamada, for example. Consequently, all the variables $U1 hereinafter are replaced with Yamada for installation.

In the definition 60, the information to create the definition is provided in a SQL statement.

The user 1 is created in the statement 61 and the user 2 is created in the statement 62. In the statement 63, the user 1 is set as the schema creator of the next statement 64. In the statement 64, the schema S1 is created as a belonging of the user 1 who is set in the statement 63. Similarly, in the statements 65–67, the schemas S2 and S3 are created for the user 2.

In the statement 68, the user 1 is set as the executor of the following SQL statements. In the statement 69, the real table T1 is created. In the statement 70, it is declared that the user 2 is granted the privilege to refer to the real table T1 with grant option. In the statement 71, it is defined to create view V1 by selecting data whose value of the column t11 are 100 or bigger from the real table T1. In the statements 72–75, it is stated that the table 2 is created for the user 2, view V2 is created from the real tables T1 and T2 and view V3 is created from the view V2.

The dependence information 80 shows the dependence relation which are extracted from the definition of the backuped database system. In this example, the statement 81 and 82 show that user 1 and user 2 are independent on anything. The statement 83 shows that the existence of the user 1 is necessary for the schema S1. The statements 84 and 85 show that the existence of the user 2 is necessary for the schemas S2 and S3. Consequently, the user 1 must already exist in order to create the schema 1. Similarly, the user 2 must already exist in order to create the schemas S2 and S3.

The statement 86 shows that the schema S1 is necessary for the real table T1. The statement 87 shows that the schema S2 is necessary for the real table T2. The statement 88 shows that the real table T1 and the schema S1 are necessary for the view V1. The statement 89 shows that the real tables T1 and T2 and the schema S2 as well as the SELECT privilege for T1 granted from the user 1 to the user 2 are necessary for the view V2. The statement 90 shows that the view V2 and the schema S3 are necessary for the view V3. The statement 91 shows that the user 1 and user 2 and the real table T1 are necessary for the SELECT privilege for the real table T1 granted from the user 1 to the user 2. The statement 92 shows that the view V2 is necessary for the program P1. The statement 93 shows that the real table T2 is necessary for the program P2. The statement 94 shows that the views V1 and V3 are necessary for the program P3.

The described dependence information is able to be extracted from the catalog of the definition as explained in the Related Art. For example, the statements 81 and 82 are able to be extracted by referring to the information of the user catalog. The statements 83–85 are able to be extracted by referring to the information of the schema catalog. The statements 86 and 87 are able to be extracted by referring to the information of the table catalog. The statements 88 and 89 are able to be extracted by referring to the information of the table catalog, view definition catalog and reference relation of view and table catalog. The statement 91 is able to be extracted by referring to the information of the authority catalog. The statements 92–94 are able to be extracted by referring to the reference relation of procedure and table.

The data 100 provides the actual data in the database in an insert command of the SQL statement. The data insert command of the real table T1 101 and the data insert command of the real table T2 102 are also shown.

The journal 110 stores the historic data of the journal in a normal file form. In this case, the historic information of the backup objects is extracted by referring to the ID of the table names and provided in the journal 110. For example, since the real tables T1 and T2 are backuped in this case, the historic data with the ID of real tables T1 and T2 are provided in the journal 110.

Programs in normal file forms are provided in the programs 120. For example, the programs are program A, B, C and D which are in load module, and these programs are written in a general program language like COBOL, etc. In the program language, the procedure written in SQL exists in a form of source code as well as the call statement in order to call for the procedure in an executable form. In this case, the procedures P1, P2 and P3 are identified as the backup objects. The procedures P1, P2 and P3 in the definition are not stored in the executable forms. Instead, the source codes of the procedures P1, P2 and P3 in the load module A, B, C, and D in the COBOL program are stored as a part of the programs. The procedures P1, P2 and P3 in the definition are not stored in the executable forms.

As described, a source program of the database language is stored in the load module corresponding to a normal program. The load module is executed in the database process system in the migrated location. Then, the database processing procedure is searched by using the ID of the database processing procedure in the catalog where the database processing procedure is to be registered in the migrated database process system. When the database processing procedure doesn't exist, the database language program in the load module is dynamically recompiled. When the database language program is registered newly in the catalog area where the database processing procedure is registered in the migrated location by using the file ID of the load module of the migrated location and a database processing procedure relative number, the execution of database process portion is resumed.

In this case, the ID of the database processing procedure is the file ID of the load module which is picked out at the running time of the application in the system wherein the application is implemented, instead of the value like a counter, etc. Therefore, the identification of the database processing procedure is guaranteed even after the porting operation. A set of the file ID and the relative number is provided to the database process portion which is written in the inserted database language. The file ID is ID of the load module corresponding to the normal program portion of the concerning application program in the operation system and obtained at the running time of the database process application. The relative number is the concerning database process portion in the concerning application program.

When the normal program needs database process in the running time, the catalog area in which the database processing procedure is registered is searched by using a set of the file ID of the operating system of the own load module which is obtained at the running time and the relative number of the required database process portion in the application. In this way, the required and registered database process portion is called out from the normal program portion.

3) Operation of the backup-migrate-restore-procedure generator

Given object specification is interpreted as follows in order to get the object catalog. In the following, the part which is marked with (*) is possible to be identified by the information of the catalog in the database in case of the backup. In case of the restoration, it is possible to be identified by the dependence information.

| | |
|---|---|
| (1) User catalog U = | φ: internal variables which store all the specified users |
| Schema catalog S = | φ: internal variables which store all the specified schemas |
| View catalog V = | φ: internal variables which store all the specified views |
| Real table catalog T = | φ: internal variables which store all the specified real tables |

-continued

| | |
|---|---|
| Authority catalog A = | φ: internal variables which store all the specified privileges |
| Program catalog P = | φ: internal variables which store all the specified programs |

(2) When the followings are designated for each specified object, each object is determined as follows;

In the following, symbol ∪ is used to joint the subject written in the right side of the symbol to the set in the left side of the symbol.

a) When a user name is specified,

| | |
|---|---|
| User catalog U = | user catalog U ∪ this user |
| Schema catalog S = | schema catalog S ∪ all the schemas owned by this user |
| Real table catalog T = | real table catalog T ∪ all the real tables in the concerning schemas (*) |
| View catalog V = | view catalog V ∪ all the views in the concerning schemas | b) When a schema name is specified,

| | |
|---|---|
| User catalog U = | user catalog U ∪ user who owns the concerning schema |
| Schema catalog S = | schema catalog S ∪ the concerning schema (*) |
| Real table catalog T = | real table catalog T ∪ all the real tables in the concerning schema (*) |
| View catalog V = | view catalog V ∪ all the views in the concerning schema (*) | c) When a schema name.table name is specified,

| | |
|---|---|
| Schema catalog S = | schema catalog S ∪ schema name which this table belongs to (*) |
| If this table is a real table, | (*) |
| Real table catalog T = | real table catalog T ∪ this table |
| If this table is a view, | (*) |
| View catalog V = | view catalog V ∪ this table | d) When privilege is specified,

| | |
|---|---|
| User catalog U = | user catalog U ∪ users who grant the concerning privilege ∪ users who receive the concerning privilege (*) |
| For the objects of the concerning privilege, the above c) is executed. | |
| Authority catalog A = | Authority catalog A ∪ concerning privilege | e) When a program name is specified,

| | |
|---|---|
| c) is executed for the table which the concerning program refers to. | |
| Program catalog P = | program catalog P ∪ concerning program |

The cases of retrieving the part which is marked with (*) from the catalog are explained later together with the explanation on the database and catalog access unit.

The cases of retrieving the part which is marked with (*) from the dependence information are as follows;

Example 1

The table catalog which belongs to a schema is retrieved.
=views and real tables which are dependent on this schema are retrieved.

In FIG. 2, it is known from the statement 86 and 88 that the table catalog belonging to S1 is T1 and V1.

Example 2

The table catalog referred to by a view =views and real tables which are depended by this view are retrieved.

In the FIG. 2, it is known from the dependence part in the statement 89 that the view V2 refers to T1 and T2.

(3) Identifications of objects are made for each case when the object range assignment is ONLY, DOWN and ALL in the following ways.

a) In case of ONLY, the specified objects are checked as follows;

If the schemas which the real tables in the real table catalog T and the views in the view catalog V belong to are in the schema catalog S, If the owners of the schemas in the schema catalog S are in the user catalog U, If the views and real tables which are referred to by the views in the view catalog V are in the view catalog V and real table catalog T, If the privileges which are necessary for the creation of the view catalog V are in the authority catalog A.

When the above conditions are not satisfied, an error is reported.

b) In case of DOWN, the objects are identified as follows;

Even though the motion is same as the motion of the backup-migrate-restore-procedure generator, the description is made herein for explanation.

The following identification is made for each view v in the present view catalog V; When table t which is referred to by the view v is a view:

View catalog V=view catalog V ∪ table t

This is repeated recursively by using table t as view v.

When table t which is referred to by the view v is a real table:

Real table catalog T
=real table catalog T ∪ table t

If schemas which the view catalog V and real table catalog T belong to are not in the schema catalog S, such schemas are added to the schema catalog S.

If owners of the schemas in the schema catalog S are not in the user catalog U, such user names are added to the user catalog U.

Consequently, even if all the objects are not specified, the conditions in the case of a) ONLY are already satisfied and the range of the objects is identified as closed.

Example 1

In case of user catalog U=Tanaka, schema catalog S=S2, view catalog V=V2 and real table catalog T=φ, The real table T1 and T2 which are referred to by V2 are added to the real table catalog T. S1 is added to the schema catalog S and Suzuki is added to the user catalog U.

Example 2

In case of user catalog U=Tanaka, schema catalog S=S3, view catalog V=V3 and real table catalog T=φ, The view V2 which is referred to by V3 is added to the view catalog V. S2 is added to the schema catalog S. The real tables T1 and T2 which are referred to by the V2 are added to the real table catalog T. S1 is added to the schema catalog S and Suzuki is added to the user catalog U.

c) In case of ALL, the objects are identified as follows;
The procedure in the case of DOWN is executed.
B=real table catalog T
D=φ
L:for each table t in the present B,
a) If no view refers to any t, operation ends.
b) If such view exists, for each view v which refers to t,
Authority catalog A=authority catalog A ∪ privilege granted to the owner of v for t View catalog V=view catalog V ∪ v
When all the tables referred to by v are in B:
B=B ∪ v
D=D ∪ V
B=D, D=φ
Back to L
Described cases of DOWN and ALL are illustrated in FIG. 3.

(4) The user names assigned in the restricted range assignment are included in the restricted user catalog RU(If no user is assigned, the restricted user catalog RU=φ).

The schema names assigned in the restricted range assignment are included in the restricted schema catalog RS(If no schema is assigned, the restricted schema catalog RS=φ).

(5) User catalog U=user catalog U ∩ restricted user catalog RU(intersection of user catalog U and restricted user catalog RU)

Schema catalog S=schema catalog S ∩ restricted schema catalog RS(intersection of schema catalog S and restricted schema catalog RS)

(6) The real tables and views which are not in the schemas in the schema catalog S are deleted from the real table catalog T and view catalog V being updated in the above.

(7) In case of restoration and migration, the user catalog U, schema catalog S, view catalog V, real table catalog T, authority catalog A, restricted user catalog RU and restricted schema catalog RS are sent to the controller together with the assigned parameters.

(8) In case of backup, the following procedure is executed.

1) A CREATE USER statement which creates the users identified in the user catalog U is created as the definition. The user names are created as the variables which are replaceable respectively. Sets of the variable names and the user names are stored orderly as replace information.

2) A CREATE SCHEMA statement which creates the schemas based on the identified user catalog U and identified schema catalog S is created and stored as the definition.

3) CREATE TABLE, CREATE VIEW and GRANT statements which create and define the real tables, views and privilege to access related to the above users and schemas are created and stored as the definition (details are described later).

4) Dependence relations identified in the above are stored as the dependence information. The dependence relations are distinguished as follows. User names in the user catalog U are independent. Schema names in the schema catalog S are taken as dependent on the users who own the schemas and the dependence information is generated.

Real tables in the real table catalog T are taken as dependent on the schemas which the real tables belong to and the dependence information is created.

Views in the view catalog V are taken as dependent on the real tables and views which are referred to by the view catalog V, related privileges and schemas which the view catalog V belongs to and the dependence information is generated.

Privileges are taken as dependent on the grantors, receivers, tables in privilege object and the dependence information is created.

Programs are taken as dependent on the tables which the programs refer to and the dependence information is generated.

Storing procedure of the real tables, views and privileges operated by the backup-migrate-restore-procedure generator is as follows.

The real tables and the views are mutually related and privileges are necessary to create a view. Therefore, a CREATE TABLE statement to create the table which the view refers to and a GRANT statement which defines the privileges assumed by the view must be executed before the view create statement is executed.

Rough storing procedure of the real tables, views and privileges are as follows;

(1) At first, all the concerning real tables are created. When each table is created, concerning privilege granted for the table is defined.

(2) Views which refer only to the real tables created in the above (1) are created. When each view is created, concerning privilege granted for the view is defined.

(3) Views which refer only to the above real tables and views are created. When each view is created, concerning privilege granted for the view is defined.

(4) When no view refers to the real tables and views which are created so far, the procedure stops.

In case that a GRANT statement for the privilege is created, multiple GRANT statements are created occasionally. For example, Fushimi creates table T1 and grants privilege on this table for Ando with GRANT OPTION. Then, Ando grants the privilege for Iwasaki. In this case, the GRANT statement has to be created in the order of Fushimi to Ando and Ando to Iwasaki in order to execute the statement correctly. Therefore, a procedure to create the order correctly is necessary. In the most general case where the real table catalog is obtained in the described procedure and ALL is selected as object range assignment, an sample procedure of creating a CREATE TABLE statement, a CREATE VIEW statement and a GRANT statement in a correct order is as follows. Since a CREATE USER statement and a CREATE SCHEMA statement are able to be created from the user catalog and the schema catalog S respectively, explanation is omitted here.

[Input]
Real table catalog T: Object table catalog
[Output]
A sequence of CREATE TABLE, CREATE VIEW and GRANT statements
[Procedure]

(1) Hash table B is emptied. B stores all the real tables and views which have created CREATE statements (2) Hash table D is emptied. D shows all the real tables and views which are possibly referred to by a view in an upper level among the views and real tables which have created CREATE statements so far.

(3) For each table t in the real table catalog T, if t is not in any schema in the schema catalog S, no action is taken.

if table t is in a schema in the schema catalog S, a CREATE TABLE statement for the table t is created. Table t is registered in the hash table B with the belonging schema name. Table t is registered in the hash table D with the belonging schema name.

Then, a grant statement whose object is the table t is created in the following GRANT statement creation procedure.

(4) This is made as a LOOP label.

Hash table C is emptied. The hash table C shows all the views which refer to the views and real tables which are elements of the hash table D.

Regarding on each table d in the hash table D, the following which starts with (a) is repeated for each view v which refers to the table d.

a) If the view v is in a schema in the schema catalog S, the view v is registered in the hash table C.

If the hash table C is empty, the hash table D is emptied and the routine goes to end.

Otherwise, the hash table D is emptied.

For each table c in the hash table C, the following a) and b) are repeated.

For each view and table tv which the view v refers to,
   a) if tv is in the hash table B, continue.
   b) if tv is not in the hash table B, break.

If all the views and real tables which are referred to by v are in the hash table B (if the above is terminated with continue),
   a) A CREATE VIEW statement for v is created.
   b) The view v is registered in the hash table B.
   c) The view v is registered in the hash table D.
Back to LOOP label.

The described procedure is further explained by using the sample shown in the FIG. 2.

Hash table B, C and D are assumed to be prepared as shown in the FIG. 4. At first, table T1 is selected from schema S1 and real table T1 is created. The real table T1 is registered in the hash table B and D together with the schema name. Then, a GRANT statement is created whose object is the real table T1. So far, the definition 68, 69 and 70 shown in the FIG. 2 are created.

Next, view V1 which refers to the real table T1 is registered in the hash table C. At this time, the hash table B, C and D are in the condition shown in FIG. 5.

Since the hash table D is emptied and the views and the real tables (table T1, in this case) which are referred to by the view V1 registered in the hash table C are already registered in the hash table B, a CREATE statement for view V1 is created. At this moment, statement 71 shown in the FIG. 2 is created. Then, the view V1 is registered in the hash table B and D. Then, each table is in a condition shown in FIG. 6. The statement 70 in the FIG. 2 is explained later.

Then, going back to the LOOP label in the earlier described procedure, the hash table C is emptied. It is checked if any view refers to table V1 in the hash table D. At this time, since no view refers to view V1, no registration is made in the hash table C. Since the hash table is empty, the loop ends.

For real table T2 in the schema S2, same process is made. In FIG. 7, the real table T2 is registered in the hash table B and D together with the belonging schema name. At this moment, each table is in a condition shown in the FIG. 7. Next, a GRANT statement is created for the real table T2. However, since privilege is not granted for the real table T2, nothing is created. So far, statement 72 and 73 shown in FIG. 2 are created.

Then, the hash table C is emptied. It is checked if any view refers to the real table T2 registered in the hash table D. In this case, since view V2 exists, the view V2 is registered in the hash table C. At this moment, each table is in a condition shown in FIG. 8.

Then, the hash table D is emptied. It is checked if each view or real table which is referred to by the view V2 registered in the hash table C is registered in the hash table B. The view V2 refers to the real table T1 and T2 which are already registered in the hash table B. Therefore, a CREATE statement for the view V2 is created. At this moment, the statement 74 shown in the FIG. 2 is created. The view V2 is registered in the hash table B and D. Each table is in a condition shown in FIG. 9. Then, going back to the LOOP label, the hash table C is emptied. It is checked if any view refers to the table registered in the hash table D. Concerning the view V2, since the view V3 refers to the view V2, the view V3 is registered in the hash table C. At this moment, each table is in a condition shown in FIG. 10. Since the view V3 refers only to the view V2 and the view V2 is already registered in the hash table B, a CREATE statement is created for the view V3. At this moment the statement 75 in the FIG. 2 is created. Then, the view V3 is registered in the hash table B and D. At this time, each table is in a condition shown in FIG. 11.

Then, going back to the loop label again, since no view refers to the view V3 and no view that should be newly registered in the hash table C exists, the hash table becomes empty. The process ends.

As described, the real tables and views are able to be created consistently in this procedure.

Next, procedure to create a GRANT statement is explained.

Procedure of the GRANT statement creation
(input: object name, owner name)
(1) Hash table G is emptied.
(2) A "owner name" is registered in the hash table G.
(3) This is made as a LOOP label.
(4) If the has table G is empty, the procedure ends here. Otherwise, hash table H is emptied.

For each man g in the hash table G, a GRANT statement is created for all the privileges where the grantor is g and the object is "object name."

If the privilege is WITH GRANT OPTION and the receiver is in the user catalog U, the receiver is registered in hash table H.

G=H

Back to the LOOP label

A sample creation procedure of the GRANT statement is explained. The creation procedure of the GRANT statement is called in the process of generating storing procedure of the real tables and views.

The case of creating the statement 70 which is the GRANT statement shown in FIG. 2 is explained. In the statement 70 of FIG. 2, $U1 grants $U2 a SELECT privilege. As shown in FIG. 12, the owner name, Suzuki is registered as $U1 in the hash table G at first. Then, GRANT statements are created for all the privileges owned by Suzuki. The GRANT statements are created by referring to the authority catalog in FIG. 24.

The authority catalog includes a case where the system grants privilege and a case where a user grants another user privilege. Here, only the case where the user grants another user privilege is chosen and the case where the system grants privilege is ignored.

In this example, the user, Suzuki grants the user, Tanaka the SELECT privilege. Therefore, the GRANT statement where the user, Suzuki grants the user, Tanaka the SELECT privilege is created. In this case, the privilege may be re-granted. Therefore, in the hash table H, the user name, Tanaka who can re-grant the privilege is registered. At this moment, condition is as shown in FIG. 13. Then, the hash table H is replaced with the hash table G. Consequently, Tanaka is registered in the hash table G as shown in FIG. 14.

Privileges of Tanaka are searched from the authority catalog as described. If Tanaka grants privilege for other users, the GRANT statements are created for all the privileges. In this example, since it is not registered in the authority catalog that Tanaka grants other users privilege, the GRANT statement is not created. As described, when the user 1 is Suzuki, one GRANT statement is created.

4) Operation of the database and catalog access unit

The database and catalog access unit is an apparatus to access the content of the database itself and the content of the catalog. This may be realized by setting a special interface in a database kernel 10. In case of SQL, etc, this part may also be written in the SQL.

The access to the database is explained.

For example, in order to retrieve the content of the specified real table T1, the following SQL statement is executed;

SELECT * FROM T1

In order to add the content of the real table T1, the following SQL statement is executed;

INSERT INTO T1
((1,AAA,2), (2,bbb,4) . . . )

Since many SQL systems have interface for faster insert interface of the content of the tables, such interface may be used. For example, when the content of the magnetic tape with logic name '/DEV/MTOO' is inserted to the real table T1 as the content of the table, the following statement is executed;

INSERT INTO T1 FROM/DEV/MTOO

Next, the access to the catalog is explained.

For example, the catalog information which is required by the backup-migrate-restore-procedure generator is obtained from the catalog by using SQL.

All the schemas owned by the concerning user u SELECT schema name FROM schema information catalog WHERE owner=u Catalog of the views which refer to the table t in the schema s SELECT view name FROM reference relation of view and table WHERE referred table name=t AND referred schema name=s As described, necessary information may be obtained with a normal SQL interface by the normal SQL program.

In case of restoration and migration, when the content of the catalog is restored in the object system, the restoration is made automatically by executing the definition group command of SQL as described.

For example, in the migrated location

---

CREATE TABLE T1(
  t11 NUMERIC[4]
    t12 CHARACTER [8]
)

--- is executed to set the required information in the table catalog and the column catalog. A number of columns in each table in the table catalog is also restored automatically by the execution of the above command in regardless of the stored information. Or, when CREATE VIEW V1(v11,v12)
AS SELECT * FROM T1 WHERE t11>100 is executed, the information of the reference relation of view and table and the column of the number of the tables in the schema, which should change when the number of tables increase in the schema, are updated. Therefore, such information is not necessary to be backuped.

As described, the embodiment 1 has a characteristic in retrieving the definition related to the required application among the multiple applications developed in the database system as well as the required data and application program and generating an application package from them which is able to be migrated to another machine or system.

Furthermore, the embodiment 1 has a characteristic in unnecessariness of a special catalog information access means in case of retrieving the definition by executing the readout of the catalog information in SQL if the catalog information is accessible by using SQL.

Furthermore, in case of restoration, the definition in the migrating content is converted to a historically consistent sequence of commands (such as a CREATE TABLE, etc.) defining the definition and the restoration is made by executing the normal SQL definition commands in the specified order without a special system interface for the restoration. For the restoration of the data, the data are converted to a data insert command of SQL and executed at the restoration time. Since the international standard language called SQL is used, the package is able to be migrated over vendors. For example, the number of tables in the schema is automatically updated by the system in a normal way when the SQL statement of the table definition is executed orderly in the migrated location. Therefore, migration of the related information is unnecessary. Furthermore, a special interface is unnecessary.

Further, the embodiment 1 has a characteristic in the ability of the installation of the package by replacing the subjects such as a storage location of the user name and data which may overlap in the migrated system.

Further, the embodiment 1 has a characteristic in saving memory to store the SQL procedure by re-compiling the SQL procedure when the catalog does not accompany the procedure when the execution is made in the migrated location and registering the re-compiled result instead of storing the SQL procedure. Furthermore, the embodiment 1 has a characteristic in the ability of migrating the application program corresponding to the optimal parameter in the migrated location.

Further, the data are not backuped or restored, but only the database definition and the memory area of the database definition are kept in order to save the memory area for the backup. Therefore, only the necessary frame for the application operation is installed as a package and the content of the database is accumulated in accordance with the progress of the operation of the application.

Further, this procedure is applied to the conventional simple store and restore procedure of the database in order to execute the generation of a package and storing and restoration of the database as one procedure.

Finally, in case of storing the journal, since a table ID is accompanied to each historical record in the journal, storing and restoration of each table in a unit is made possible.

In the database and program backup, migration and restoration apparatus according to the embodiment, the controller identifies a storing object by the parameter assigned by a backup request and the backup procedure generator 3 refers to the definition. Accordingly, the backuping procedure is generated consistently in a chronological order. Therefore, the definition which is necessary for the assigned application may be extracted from the database system where another application is being developed or operated, while the time and mutual relation is kept. By using the extracted definition, the necessary information for the application may be restored and migrated.

In the database and program backup, migration and restoration apparatus according to the embodiment, at least one of a user name, schema name, table name, view name, program name and privilege name to be backuped is assigned as a backup request and the object type and range of the backup object is assigned. The controller identifies the backup object by judging the objects necessary for the backup in the definition based on the backup request object and the type and range of the backup object. Therefore, the backup object may be identified automatically when minimum necessary information is input to the command interpreter as the backup request.

In the database and program backup, migration and restoration apparatus according to the embodiment, the database system is accessed by using a database language and the database system is accessed by the database and catalog access unit 6 in a database language. Therefore, a special database access unit is unnecessary in order to backup the database system. Consequently, conventional database system and database access unit may be used.

In the database and program backup, migration and restoration apparatus according to the embodiment, information is converted to series of commands in a database language like SQL, etc. and stored, when the information in a database is backuped. Therefore, when the database is restored or migrated to another system by inputting the stored information, a special restoration or migration unit is unnecessary to be developed. A unit to handle a conventional database language is enough to restore or migrate the data.

In the database and program backup, migration and restoration apparatus according to the embodiment, the definition is converted to a definition command to create the definition in a database language like SQL, etc. and stored, when the definition is backuped. Therefore, when the database is restored or migrated to another system by inputting the definition, a special restoration or migration unit is unnecessary to be developed. A unit to handle a conventional database language is enough to restore or migrate the data.

In the database and program backup, migration and restoration apparatus according to the embodiment, data are converted to a data insert command to insert the data in a database language in case backuping the data, while the database and program backup, migration and restoration apparatus uses the definition command in a database language in case backuping the definition. Therefore, when the data are restored or migrated to another system, a special restoration or migration unit is unnecessary. A unit to handle a conventional database language is enough to restore or migrate the data.

In the database and program backup, migration and restoration apparatus according to the embodiment, replace information for being possible to replace a value of a valuable such as a user name, file name, etc. is created and stored in advance. When the database system is migrated to another system and a same user name, file name, etc. exists in the system of the migrated location, the overlapping of the name may be avoided. The value of the variable may be changed to a name which doesn't overlap with the existing user name, file name in the system of the migrating location by using the replace information.

In the database and program backup, migration and restoration apparatus according to the embodiment, a source code of a processing procedure is kept in a program to access a database in advance and the program instead of a processing procedure in an executable form cataloged in the definition is backuped. Since the processing procedure in an executable form is not backuped, the backuping data volume may be lessened. Furthermore, since the processing procedure is backuped by using the source code, the processing procedure may be re-compiled in a system environment of the migrated location and a processing procedure in an executable form which is optimal for the system environment in the migrated location may be generated.

In the database and program backup, migration and restoration apparatus according to the embodiment, an area reserve command to reserve a data recording area in a database is created instead of backuping the data in the database. Therefore, the backuping data volume is lessened. Furthermore, since only the data recording area is reserved when the database is migrated to another system and the definition is migrated to another system, the data may be newly accumulated in the migrated location by reserving the data recording area instead of migrating the data from the migration origin.

In the database and program backup, migration and restoration apparatus according to the embodiment, only related information of access history may be identified by an ID, while all the information in access history is backuped when a journal is backuped conventionally. Consequently, only the information of access history related to the backup object identified by the controller may be backuped.

In the database and program backup, migration and restoration apparatus according to the embodiment, the backup procedure generator identifies the dependence relation between the users, schemas, tables, views, privileges and programs, and the controller stores the dependence relation. Therefore, when data are restored or migrated from the stored data, the data may be selected or deleted by referring to the dependence information. Since the extracted dependence relation shows the relation of each element constructing the database which is cataloged in the definition, referring to the dependence relation is equal to refer to the definition in the database system. Further, referring to the dependence relation stored in the stored data in case of the restoration and migration is equal to refer to the definition in the database system. Consequently, in case additional data are extracted from the stored data or extra data are deleted from the stored data, such extraction and deletion may be made consistently.

In the database and program backup, migration and restoration apparatus according to the embodiment, a database system may be restored by inputting the stored data which are backuped by the database and program backup, migration and restoration apparatus. Since the database and program backup, migration and restoration apparatus stores the data consistently in time and mutual relationship in the storage medium, the original database system may be restored by inputting the stored data orderly.

In the database and program backup, migration and restoration apparatus according to the embodiment, since the data are stored consistently in time and mutual relationship in the storage medium, necessary definition or data may be constructed in a new location by installing the stored data orderly in a new system also in case of migration.

In the database and program backup, restoration and migration apparatus according to the embodiment, since the stored data are written in a command of a database language like SQL, etc., the definition or data in the database may be restored or migrated by executing the command. Since the definition or data, etc. may be restored or migrated by executing the command written in the database language, the database system may be restored or migrated by using a conventional processor of the database language. Consequently, a special restoration or migration unit is unnecessary to restore or migrate the database system.

In the database and program backup migration and restoration apparatus according to the embodiment, when a database system is migrated to another system and an overlapping user name, file name, etc. exists in the migrated location, a new value may be given for a variable in the replace information in order to avoid the overlapping. Consequently, the system may be migrated without overlapping user name, file name, etc.

In the database and program backup, migration and restoration apparatus according to the embodiment, a processing procedure in an executable form is generated and cataloged in the definition by compiling a source code stored in the program instead of migrating the processing procedure in an executable form from the stored data in case a database system is migrated to another system. Therefore, a processing procedure in an executable form which is optimal for the system environment in the migrated location is generated.

In the database and program backup, restoration and migration apparatus according to the embodiment, restore and migrate specifications are input and the restoration/migration procedure generator evaluates the restoring or migrating data in accordance with the input restore and migrate specifications by referring to the dependence relation of the stored data. Therefore, the system may be restored or migrated by using a part of the stored data instead of all the stored data.

Embodiment 2

In case of migration and restoration, in addition to migrating and restoring all the backuped data, migration specification suitable for the system environment of the migrated location and restore specification such as the specification on the restoring objects may be given by the backup-migrate-restore-procedure generator. For example, in stead of restoring the real tables and referring to views, the views may be evaluated and realized corresponding to the real tables and the result may be restored as the real tables. Consequently, the disk capacity utilization in the migrated location is lessened and the restoration and migration of only the required data is made.

It is also possible to execute the selection and elimination by the SQL statement for the restoring real tables in order to restore only the required data in the migrated or restored location.

Furthermore, even in case that the whole database is backuped, when the migrate specification is given, only the database definition and its memory area may be obtained. Consequently, it is made possible to install only the necessary frame for the application operation as a package and to accumulate the database content in accordance with the progress in the application operation in the migrated location.

In case of restoration, when the restore specification is given, a part of the real tables are able to be restored. Also for the journals, only the journals corresponding to the restoring real tables among the stored journals are able to be selected.

As described, when migration and restoration is made by using only a part of the backuped data, since the dependence information exists in the backuped data, a part of the data may be extracted from the backuped data consistently by referring to the dependence information.

Embodiment 3

In the embodiment 2, SQL is used. However, other type of a database language may be used to yield a same kind of effect.

Embodiment 4

In the embodiment 1, as the database system backup migration restoration apparatus, an apparatus which is able to backup, migrate and restore the database and the program in one apparatus is explained. However, an apparatus which is only able to backup, an apparatus which is only able to migrate and an apparatus which is only able to restore may exist separately.

What is claimed is:

1. A database system including programs, data, and definitions related to the programs and the data, comprising:

(a) extracting means for extracting the programs, the data, and the definitions, including means for using a database language for accessing and extracting the programs, the data and the definitions;

(b) backup means for saving the extracted programs, the extracted data and the extracted definition as backup data, said backup means including creating means for creating a command sequence as the backup data, the command sequence being written in a database language, said creating means including means for creating the command sequence to consistently match the database system referring to the definitions;

(c) restoration means for recovering the database system by using the backup data; and (d) migration means for installing the database system by using the backup data.

2. A method of backup, restoring and migrating a database system, comprising the steps of:

(a) inputting a backup request to the database system;

(b) identifying data to be saved according to the backup request;

(c) saving the identified data in an executable form;

(d) upon receiving a restore request, recovering the saved data in the executable form; and (e) upon receiving a migrate request, configuring the saved data in the executable form to install a new database system;

wherein the saving step includes the step of performing the saving of the data in a database language and the step of converting the saved data into a command and saving the command in said database language.

3. A database system backup apparatus for saving backup objects to a storage medium from a database system which has a definition and data defined by the definition, comprising:

(a) database access means for accessing the database system;

(b) storage medium access means for saving the backup objects as backup data to the storage medium;

(c) command interpreter means for inputting and interpreting a backup command of the database system;

(d) backup procedure generator means for accessing the definition in the database system through the database access means and generating a backup procedure for saving the backup objects; and (e) control means for identifying the backup objects in the database system based on the backup command interpreted by the command interpreter means, giving the backup objects to the backup procedure generator means so as to get the backup procedure, extracting the backup objects from the database system with the database access means according to the backup procedure, and storing the backup objects to the storage medium with the storage medium access means.

4. The database system backup apparatus of claim 3, wherein the command interpreter means inputs the backup command with a list of objects having at least one of a name of data category description unit such as user names, schema, a data name such as SQL table and file, a logical data name such as view, a program name, and privilege name, and with an object type assignment and an object range assignment of the objects, and the control means identifies the backup objects which are included in the object type assignment and the object range assignment referring to the definition based on the list of the objects and the object type assignment and the object range assignment inputted.

5. The database system backup apparatus of claim 3, wherein the database system is accessed with a database language, and the database access means accesses the database system with the database language.

6. The database system backup apparatus of claim 3, wherein the control means converts backup objects to a form of a command description written in a database language and storing the command description in the storage medium.

7. The database system backup apparatus of claim 3, wherein the control means converts the definition to be saved to a form of a definition command for creating the definition written in a database language and storing the definition command in the storage medium, in case that the definition is one of the backup objects.

8. The database system backup apparatus of claim 3, wherein the control means converts the data to be saved to a form of a data insert command for inserting data written in a database language, and storing the insert command in the storage medium, in case that the data are one of the backup objects.

9. The database system backup apparatus of claim 3, wherein the control means creates replace information for being possible to replace a value of a valuable and storing the replace information in the storage medium, in case that the valuable being possible to replace the value thereof is one of the backup objects.

10. The database system backup apparatus of claim 3, wherein the definition in the database system catalogs an executable procedure based on a database language, the database system includes a program having a source code of the procedure and processing data by executing the executable procedure cataloged in the definition, and the database system backup apparatus further comprising program access means for accessing the program, wherein, in case that the executable procedure is one of the backup objects, the control means identifies the program which has the source code of the executable procedure, as the backup object instead of the executable procedure, and extracts the program to be saved with the program access means and stores the program to the storage medium.

11. The database system backup apparatus of claim 3, wherein the control means creates an area reserve command for reserving a data recording area written in a database language and storing the area reserve command to the storage medium.

12. The database system backup apparatus of claim 3, wherein the database system has a journal for recording access history with a data ID, the control means searches the data ID recorded in the journal and extracts the access history related to the backup objects based on the search of the data ID, and stores the extracted access history as a backup journal in the storage medium.

13. The database system backup apparatus of claim 3, wherein the definition defines a dependence relation of data, and the backup procedure generator means identifies the dependence relation between the data to be saved, and the control means stores the dependence relation identified by the backup procedure generator means to the storage medium.

14. A database system backup apparatus for saving backup objects to a storage medium from a database system, the database system including a definition and data defined by the definition, comprising:
   (a) database access means for accessing the database system;
   (b) storage medium access means for saving the backup objects as backup data in the storage medium;
   (c) command interpreter means including:
      (1) means for receiving and interpreting a backup command, and
      (2) means for providing the backup command to a control means;
   (d) backup procedure generator means including:
      (1) means for receiving the definition in the database system through the database access means, and
      (2) means for generating a backup procedure for saving the backup objects; and
   (e) the control means including:
      (1) means for identifying the backup objects in the database system based on the backup command interpreted by the command interpreter means,
      (2) means for providing the backup objects to the backup procedure generator means,
      (3) means for using the backup procedure,
      (4) means for extracting the backup objects from the database system with the database access means according to the backup procedure, and
      (5) means for providing the backup objects to the storage medium access means.

15. The database system backup apparatus of claim 14 wherein the backup command includes:
   (a) a list of objects, the list having at least one of the objects being a name of a data category description unit,
   (b) an object type assignment, and
   (c) an object range assignment.

16. The database system backup apparatus of claim 14 wherein the database access means includes a database language to access the database system.

17. The database system backup apparatus of claim 14 wherein the control means includes:
   (a) means for converting the backup objects to a form of a command description, the command description written in a database language, and
   (b) means for providing the command description to the storage medium access means for saving in the storage medium.

18. The database system backup apparatus of claim 14 wherein the control means includes:
   (a) means for converting the definition to be saved to a form of a definition command, the definition command creates the definition to be written in a database language, and
   (b) means for providing the definition command to the storage medium access means for saving the definition command in the storage medium, when the definition is one of the backup objects.

19. The database system backup apparatus of claim 14 wherein the control means includes:
   (a) means for converting the data to be saved to a form of a data insert command, the data insert command for inserting the data to be written in a database language, and
   (b) means for providing the data insert command to the storage medium access means for saving the data insert command in the storage medium, when the data is one of the backup objects.

20. The database system backup apparatus of claim 14 wherein the control means includes:
   (a) means for creating replace information, the replace information to replace a value of a variable, and
   (b) means for providing the replace information to the storage medium access means for saving the replace information in the storage medium, when the variable is one of the backup objects.

21. The database system backup apparatus of claim 14 further comprising program access means for accessing a program, the program having a source code of a procedure and processing data by executing an executable procedure, the executable procedure being cataloged by the definition in the database system based on a database language.

22. The database system backup apparatus of claim 21 wherein the control means includes:
   (a) means for identifying the program which has the source code of the executable procedure as the backup object, instead of the executable procedure,
   (b) means for extracting the program to be saved with the program access means; and
   (c) means for providing the program to the storage medium access means for saving the program in the storage medium.

23. The database system backup apparatus of claim 14 wherein the control means includes:
   (a) means for creating an area reserve command for reserving a data recording area, the data recording to be written in a database language; and
   (b) means for providing the area reserve command to the storage medium access means for saving the area reserve command in the storage medium.

24. The database system backup apparatus of claim 14 wherein the control means includes:
   (a) means for searching a data ID recorded in a journal in the database system;
   (b) means for extracting an access history related to the backup objects based on the search of the data ID; and
   (c) means for providing the extracted access history to the storage medium access means for saving the extracted access history as a backup journal in the storage medium.

25. The database system backup apparatus of claim 14 wherein the backup procedure generator means includes:
   (a) means for identifying a dependence relation between the data to be saved, the dependence relation being defined by the definition; and
   (b) means for providing the dependence relation to the storage medium access means for saving the dependence relation in the storage medium.

26. A database system restoration apparatus for recovering a database system, comprising:
   (a) storage medium access means for accessing backup data from a storage medium;
   (b) command interpreter means including:
      (1) means for receiving and interpreting a restore command, and
      (2) means for providing the restore command to a control means;
   (c) restore procedure generator means including:
      (1) means for receiving the backup data from the controller, and
      (2) means for generating a restore procedure based on the backup data; and
   (d) the control means including:
      (1) means for identifying the backup data in the storage medium based on the restore command interpreted by the command interpreter means,
      (2) means for providing the backup data to the restore procedure generator means by the storage medium access means, and
      (3) means for using the restore procedure to recover the database system.

27. A database system migration apparatus for configuring a database system, comprising:
   (a) storage medium access means for accessing backup data from a storage medium;
   (b) command interpreter means including:
      (1) means for receiving and interpreting a migrate command, and
      (2) means for providing the migrate command to a control means;
   (c) migrate procedure generator means including:
      (1) means for receiving the backup data from the controller, and
      (2) means for generating a migrate procedure based on the backup data, and
   (d) the control means including:
      (1) means for identifying the backup data in the storage medium based on the migrate command interpreted by the command interpreter means,
      (2) means for providing the backup data to the migrate procedure generator means by the storage medium access means, and
      (3) means for using the migrate procedure to configure the database system.

28. A database system restoration apparatus for recovering a database system, comprising:
   (a) storage medium access means for accessing backup command descriptions from a storage medium;
   (b) command interpreter means including:
      (1) means for receiving and interpreting a restore command, and
      (2) means for providing the restore command to a control means;
   (c) restore procedure generator means including:
      (1) means for receiving the command descriptions from the controller, and
      (2) means for generating a restore procedure; and
   (d) the control means including:
      (1) means for identifying the command descriptions in the storage medium based on the restore command interpreted by the command interpreter means,
      (2) means for providing the command descriptions to the restore procedure generator means by the storage medium access means, and
      (3) means for executing the command descriptions with the restore procedure to recover the database system.

29. A database system restoration apparatus for recovering a database system, comprising:
   (a) storage medium access means for accessing backup definition commands from a storage medium;
   (b) command interpreter means including:
      (1) means for receiving and interpreting a restore command, and
      (2) means for providing the restore command to a control means;
   (c) restore procedure generator means including:
      (1) means for receiving the definition commands from the controller, and
      (2) means for generating a restore procedure; and
   (d) the control means including:
      (1) means for identifying the definition commands in the storage medium based on the restore command interpreted by the command interpreter means,
      (2) means for providing the definition commands to the restore procedure generator means by the storage medium access means, and
      (3) means for executing the definition commands with the restore procedure to recover the database system.

30. A database system restoration apparatus for recovering a database system, comprising:
 (a) storage medium access means for accessing backup data insert commands from a storage medium;
 (b) command interpreter means including:
  (1) means for receiving and interpreting a restore command, and
  (2) means for providing the restore command to a control means;
 (c) restore procedure generator means including:
  (1) means for receiving the data insert commands from the controller, and
  (2) means for generating a restore procedure; and
 (d) the control means including:
  (1) means for identifying the data insert commands in the storage medium based on the restore command interpreted by the command interpreter means,
  (2) means for providing the data insert commands to the restore procedure generator means by the storage medium access means, and
  (3) means for executing the data insert commands with the restore procedure to recover the database system.

31. A database system migration apparatus for configuring a database system, comprising:
 (a) storage medium access means for accessing backup command descriptions from a storage medium;
 (b) command interpreter means including:
  (1) means for receiving and interpreting a migrate command, and
  (2) means for providing the migrate command to a control means;
 (c) restore procedure generator means including:
  (1) means for receiving the command descriptions from the controller, and
  (2) means for generating a migrate procedure, and
 (d) the control means including:
  (1) means for identifying the command descriptions in the storage medium based on the migrate command interpreted by the command interpreter means,
  (2) means for providing the command descriptions to the migrate procedure generator means by the storage medium access means, and
  (3) means for executing the command descriptions with the migrate procedure to configure the database system.

32. A database system migration apparatus for configuring a database system, comprising:
 (a) storage medium access means for accessing backup definition commands from a storage medium;
 (b) command interpreter means including:
  (1) means for receiving and interpreting a migrate command, and
  (2) means for providing the migrate command to a control means;
 (c) migrate procedure generator means including:
  (1) means for receiving the definition commands from the controller, and
  (2) means for generating a migrate procedure; and
 (d) the control means including:
  (1) means for identifying the definition commands in the storage medium based on the migrate command interpreted by the command interpreter means,
  (2) means for providing the definition commands to the migrate procedure generator means by the storage medium access means, and
  (3) means for executing the definition commands with the migrate procedure to configure the database system.

33. A database system migration apparatus for configuring a database system, comprising:
 (a) storage medium access means for accessing backup data insert commands from a storage medium;
 (b) command interpreter means including:
  (1) means for receiving and interpreting a migrate command, and
  (2) means for providing the migrate command to a control means;
 (c) migrate procedure generator means including:
  (1) means for receiving the data insert commands from the controller, and
  (2) means for generating a migrate procedure; and
 (d) the control means including:
  (1) means for identifying the data insert commands in the storage medium based on the migrate command interpreted by the command interpreter means,
  (2) means for providing the data insert commands to the migrate procedure generator means by the storage medium access means, and
  (3) means for executing the data insert commands with the migrate procedure to configure the database system.

34. A database system migration apparatus for configuring a database system, comprising:
 (a) storage medium access means for accessing replace information from a storage medium;
 (b) command interpreter means including:
  (1) means for receiving and interpreting a migrate command, and
  (2) means for providing the migrate command to a control means;
 (c) migrate procedure generator means including:
  (1) means for receiving the replace information from the controller, and
  (2) means for generating a migrate procedure; and
 (d) the control means including:
  (1) means for identifying the replace information in the storage medium based on the migrate command interpreted by the command interpreter means,
  (2) means for providing the replace information to the migrate procedure generator means by the storage medium access means, and
  (3) means for using the migrate procedure with the replace information to configure the database system.

35. A database system migration apparatus for configuring a database system, comprising:
 (a) storage medium access means for accessing a backup program from a storage medium;
 (b) command interpreter means including:
  (1) means for receiving and interpreting a migrate command, and
  (2) means for providing the migrate command to a control means;
 (c) migrate procedure generator means including:
  (1) means for receiving the program from the controller, and
  (2) means for generating a migrate procedure; and
 (d) the control means including:
  (1) means for identifying the program in the storage medium based on the migrate command interpreted by the command interpreter means, (2) means for providing the program to the migrate procedure generator means by the storage medium access means, (3) means for compiling a source code of a procedure of the program and generating an executable procedure when an executable procedure is not cataloged in a definition at the execution time of the program, and (4) means for executing the migrate procedure to configure the database system.

36. A database system migration apparatus for configuring a database system, comprising:

(a) storage medium access means for accessing backup access history from a storage medium;

(b) command interpreter means including:
(1) means for receiving and interpreting a migrate command, and
(2) means for providing the migrate command to a control means;

(c) migrate procedure generator means including:
(1) means for receiving a migrate specification from the controller,
(2) means for referring a dependence relation stored in the storage medium,
(3) means for evaluating backup data with the migrate specification, and
(4) means for installing the backup data based on the migrate specification to configure a database system; and (d) the control means including:
(1) means for identifying the access history in the storage medium based on the migrate command interpreted by the command interpreter means, and (2) means for providing the access history to the migrate procedure generator means by the storage medium access means.

37. A database system restoration apparatus for recovering a database system, comprising:

(a) storage medium access means for accessing backup access history from a storage medium;

(b) command interpreter means including:
(1) means for receiving and interpreting a restore command, and
(2) means for providing the restore command to a control means;

(c) restore procedure generator means including:
(1) means for receiving a restore specification from the controller,
(2) means for referring a dependence relation stored in the storage medium,
(3) means for evaluating backup data with the restore specification, and
(4) means for installing the backup data based on the restore specification to configure a database system; and (d) the control means including:
(1) means for identifying the access history in the storage medium based on the restore command interpreted by the command interpreter means, and
(2) means for providing the access history to the restore procedure generator means by the storage medium access means.

\* \* \* \* \*